United States Patent
Hirota et al.

(10) Patent No.: US 7,352,416 B2
(45) Date of Patent: Apr. 1, 2008

(54) POLARIZATION DIRECTION OF INCIDENT LIGHT BEAM PERPENDICULAR OR PARALLEL TO LIQUID DISPLAY MOLECULAR ORIENTATION FOR REDUCED DRIVE VOLTAGE

(75) Inventors: Shoichi Hirota, Hitachi (JP); Makoto Tsumura, Hitachi (JP); Iwao Takemoto, Mobara (JP); Hideki Nakagawa, Chiba (JP); Satoshi Ouchi, Kamakura (JP); Taro Imahase, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/082,113

(22) Filed: Feb. 26, 2002

(65) Prior Publication Data
US 2003/0063232 A1    Apr. 3, 2003

(30) Foreign Application Priority Data
Sep. 28, 2001    (JP) ............................. 2001-298974

(51) Int. Cl.
*G02F 1/1335*    (2006.01)
(52) U.S. Cl. .......................................... 349/5; 349/113
(58) Field of Classification Search ................ 349/112, 349/5–9, 113–114
See application file for complete search history.

(56) References Cited

U.S. PATENT DOCUMENTS

| | | | |
|---|---|---|---|
| 4,278,327 A * | 7/1981 | McMahon et al. ........... 349/197 |
| 4,767,190 A * | 8/1988 | Dir et al. ........................ 349/3 |
| 5,231,522 A | 7/1993 | Sumiyoshi |
| 5,344,137 A * | 9/1994 | Komori ........................ 124/36 |
| 5,706,066 A * | 1/1998 | Sawayama et al. ......... 349/113 |
| 5,729,306 A * | 3/1998 | Miyake et al. .................. 349/9 |
| 5,807,379 A * | 9/1998 | L'Esperance, Jr. ............. 606/5 |
| 5,895,108 A * | 4/1999 | Tanaka ........................ 349/173 |
| 6,049,410 A * | 4/2000 | Nakagaki et al. ........... 359/253 |

(Continued)

FOREIGN PATENT DOCUMENTS

EP         0 029 737         6/1981

(Continued)

OTHER PUBLICATIONS

SID 90 Digest, (1990) Rodney D. Sterling et al. p. 327.

(Continued)

*Primary Examiner*—Dung T. Nguyen
(74) *Attorney, Agent, or Firm*—Antonelli, Terry, Stout & Kraus, LLP.

(57) ABSTRACT

A liquid crystal display element comprising two transparent substrates, at least one of which is transparent, and a liquid crystal layer interposed between the two substrates. A plurality of pixels and active elements for driving the liquid crystal at the plurality of pixels are incorporated into at least one of the two substrates, and an optical axis of an incident light beam upon the liquid crystal layer is present in a plane which is substantially perpendicular to a direction of orientation of liquid crystal molecules on at least one of the two substrates, and the incident light impinges upon the liquid crystal layer in a direction which is inclined by a predetermined angle to the direction of the normal line of the substrate. With this arrangement, a desired phase modulation is obtained through slight motion of the liquid crystal molecules, thereby greatly reducing the liquid crystal drive voltage.

36 Claims, 13 Drawing Sheets

U.S. PATENT DOCUMENTS

| | | | |
|---|---|---|---|
| 6,295,109 B1 * | 9/2001 | Kubo et al. | 349/119 |
| 6,348,959 B1 * | 2/2002 | Melnick et al. | 349/110 |
| 6,417,941 B1 * | 7/2002 | Inoko | 359/15 |
| 6,464,360 B2 * | 10/2002 | Hattori et al. | 353/33 |
| 6,473,144 B1 * | 10/2002 | Ichikawa et al. | 349/106 |
| 6,478,429 B1 | 11/2002 | Aritake et al. | |
| 6,542,211 B1 * | 4/2003 | Okada et al. | 349/130 |
| 6,816,290 B2 * | 11/2004 | Mukawa | 359/15 |
| 2001/0024257 A1 * | 9/2001 | Kubo et al. | 349/138 |
| 2002/0047968 A1 * | 4/2002 | Yoshida et al. | 349/117 |

FOREIGN PATENT DOCUMENTS

| | | | |
|---|---|---|---|
| JP | 07318861 | * 12/1995 | |
| JP | A-9-189809 | 7/1997 | |
| JP | A-2000-310823 | 11/2000 | |

OTHER PUBLICATIONS

Molecular Crystal And Liquid Crystal Letters vol. 2 (1985), p. 139 E.P. Raynes et al.

Proceedings of S. P. I. E. vol. 3634, p. 80 (1999) Matthew Bone et al.

"Enhancement of SMA" Liquid Crystal Electroclinic Electro-Optic Effects Using Fabry-Perot Cavities At Oblique Incidence, Choi et al, Overseas Publishers Association, vol. 213, No. 1-4, pp. 257-267, Amsterdam, NL.

* cited by examiner

POLARIZATION DIRECTION OF INCIDENT LIGHT BEAM PERPENDICULAR OR PARALLEL TO LIQUID DISPLAY MOLECULAR ORIENTATION FOR REDUCED DRIVE VOLTAGE

BACKGROUND OF THE INVENTION

1. Field of the Invention

The present invention relates to a liquid crystal display unit, and in particular to a liquid display unit which can reduce its drive voltage.

2. Related Art

As to a projection optical system for a conventional reflection type liquid crystal panel, a system using a polarization beam splitter has been prosperously used, as disclosed in, for example, JP-A2000-310823. Further, the display system for a conventional liquid crystal panel has been normally designed with such a premise that an incident beam impinges upon the panel, substantially normal thereto. In other words, the liquid crystal panel exhibits it maximum performance if the incident beam impinges upon the panel, substantially normal thereto.

In an example of a liquid crystal display system for a reflection type panel, as disclosed in SID 90 Digest page 327, liquid crystal molecules are oriented, substantially normal to a panel substrate, and a direction in which the liquid crystal molecules are inclined upon application of a voltage and the polarizing direction of an incident beam exhibit such a relationship that both directions are shifted from each other by an angle of 45 deg. Further, a transmission type panel has such a premise that an incident light impinges upon the panel, substantially normal to the panel. As to a typical transmission type liquid crystal display system, there may be exemplified a twist nematic mode disclosed in Molecular Crystal And Liquid Crystal Letters 2 (1985), page 139.

There may be exemplified several systems having such a premise that light is impinged upon a panel, oblique thereto, as disclosed, for example, Proceedings Of S. P. I. E. 3634, page 80, or JP-A-9-189809. The incident angle to the panel disclosed in the above-mentioned Proceedings Of S. P. I. E. 3634, page 80. is about 20 to 30 deg. at most. In this liquid crystal system used therein, component parameters including a thickness of a liquid crystal layer, are optimized into a condition in which the incident angle is shifted on the basis of a display system having such a premise that an incident beam basically impinges upon the liquid crystal layer. Further, even though the incident angle to the panel is about 30 deg., the angle is changed under Snell's law when the beam enters into a glass medium from the atmospheric air, and accordingly, the incident angle of the beam to the liquid crystal layer becomes small, that is, about 19.5 deg.

Alternatively, in a system disclosed in the JP-A-9-189809, although the incident angle to the panel is about 60 deg., the optical path is changed by a hologram element so that the incident angle to a liquid crystal layer becomes relatively small. That is, in this system, the incident angle to the liquid crystal layer is at most about 10 deg because the emergent angle cannot be large due to the constraint to the F-value. For example, if the incident angle to the liquid crystal layer is 10 deg., the emergent angle from the panel becomes 15 deg. which corresponds to about 2 as a F value. Further, the liquid crystal display system has such a premise that the incident beam impinges upon the liquid crystal layer as mentioned above, basically normal thereto.

In order to lower the cost of a liquid crystal panel used in a projection type liquid crystal display unit, it is most effective to reduce the size of the panel. In order to make the panel small-sized, it is required to decrease the size of pixels. The drive voltage of a liquid crystal display system using conventional nematic liquid crystal is general in a range from 3 to 6 Vrms which is not always said as low. Further, the liquid crystal panel requires a.c. drive, and accordingly, a drive voltage range from 6 to 12 V is required. Transistors constituting a control circuit for controlling the above-mentioned voltage, and transistors at the pixels should be of high voltage-resistant type. Thus, it is self-explanatory that there is a limitation to the miniaturization of the transistors, which, in turn, impedes the miniaturization of the pixels. Thus, in the conventional system, the size of the pixels is limited to a value about 8 to 10 µm.

SUMMARY OF THE INVENTION

A main object of the present invention is to reduce the cost of a liquid crystal panel used in a projection type liquid crystal display unit, and accordingly, as a purpose to be attained, the drive voltage for liquid crystal in the liquid crystal panel used in the projection type liquid crystal display unit is lowered.

To the end, according to a first aspect of the present invention, there is provided a liquid crystal element comprising two substrates at least one of which is transparent, and a liquid crystal layer held between the two substrates, several pixels provided to at least one of the two substrates, and an active element for driving the liquid crystal layer at the plurality of pixels, wherein an optical axis of an incident beam to the liquid crystal layer is in a plane which is substantially perpendicular to a direction of orientation of liquid crystal molecules on at least one of the two substrates, and the incident beam impinges upon the liquid crystal layer in a direction which is inclined by a predetermined angle from a direction normal to the substrate.

Further, the direction of polarization of the incident beam impinging upon the liquid crystal layer in the liquid crystal display element is substantially orthogonal or parallel to the direction of the orientation of the liquid crystal molecules.

Further, the orientation of the liquid crystal molecules in the liquid crystal element is homogenous or homeotropic.

Alternatively, the liquid crystal display element may be either of a reflection type or a transmission type.

Alternatively, the display unit using the liquid crystal display element incorporates a means for maintaining the incident angle to the liquid crystal element from the outside of the element even in the liquid crystal layer, and accordingly, the angle making between the principal axis of the optical path in the liquid crystal layer and the direction normal to the substrate is set to be greater than the total reflection angle of the beam emanated from the substrate into the air.

Alternatively, the display unit using the liquid crystal display element according to the present invention incorporates a means for maintaining the incident angle to the liquid crystal element from the outside of the element even in the liquid crystal layer, and accordingly, the angle making between the principal axis of the optical path in the liquid crystal layer and the direction normal to the substrate can be set to be not less than the Brewster angle between the substrate and the air.

Alternatively, the liquid crystal display element according to the present invention incorporates a hologram element which does not substantially diffract an incident p-polarized beam but diffracts an s-polarized beam which is provided after being modulated by the liquid crystal layer, into a direction substantially perpendicular to the liquid crystal element.

Alternatively, the liquid crystal display element according to the present invention, an diffraction grating is provided for each pixel.

According to another aspect of the present invention, a display unit using a liquid crystal element according to the present invention, comprises a light source, a color separation optical system for color separation of white light from the light source into three primary color beams, liquid crystal display elements which can cope respectively with the three primary color beams, the three primary color beams obtained through the color separation being incident upon the respective liquid crystal elements in directions oblique thereto, a color composition optical system for chromatically composing emergent beams which are emitted from the liquid crystal elements in directions substantially normal to the elements, and a projection lens for projecting a beam chromatically composed by the color composition optical system.

Alternatively, in the above-mentioned display unit, the optical axis of the light source and the optical axis of the projection lens are substantially parallel with each other, or are twisted by an angle of about 90 deg. from each other, and are laid at different level while being parallel with each other, and optical prisms are for changing the optical axes are provided in the color-composition optical system and on the optical paths of the liquid crystal elements.

Alternatively, the above-mentioned display unit incorporates a liquid crystal layer which is driven by a component of an electric field which is mainly parallel to the substrate, liquid crystal layer made of a ferroelectric liquid crystal material or an antiferroelectric liquid crystal layer, which is arranged to be switched between two states of orientation of liquid crystal molecules, wherein the optical axis of an incident beam to the liquid crystal layer is in a plane which is substantially perpendicular to one of the directions of orientation of the liquid crystal molecules in the two states, and the incident beam impinges upon the liquid crystal layer in a direction which is slanted by a predetermined angle from a direction normal to the substrate.

The present invention will be explained in detail in the form of preferred embodiments with reference to the accompanying drawings:

Other objects, features and advantages of the invention will become apparent from the following description of the embodiments of the invention taken in conjunction with the accompanying drawings.

DESCRIPTION OF THE PREFERRED EMBODIMENTS OF THE INVENTION

Figure 1A:
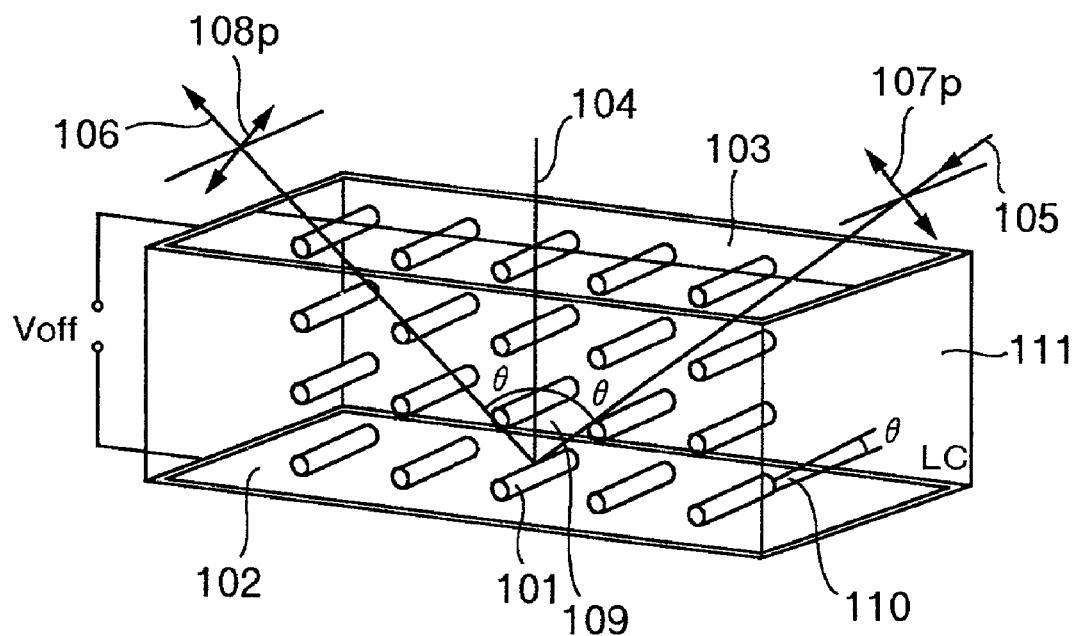
FIG. 1 is a view for explaining a principle of liquid crystal display of a liquid crystal display element according to the present invention.
Figure 1B:
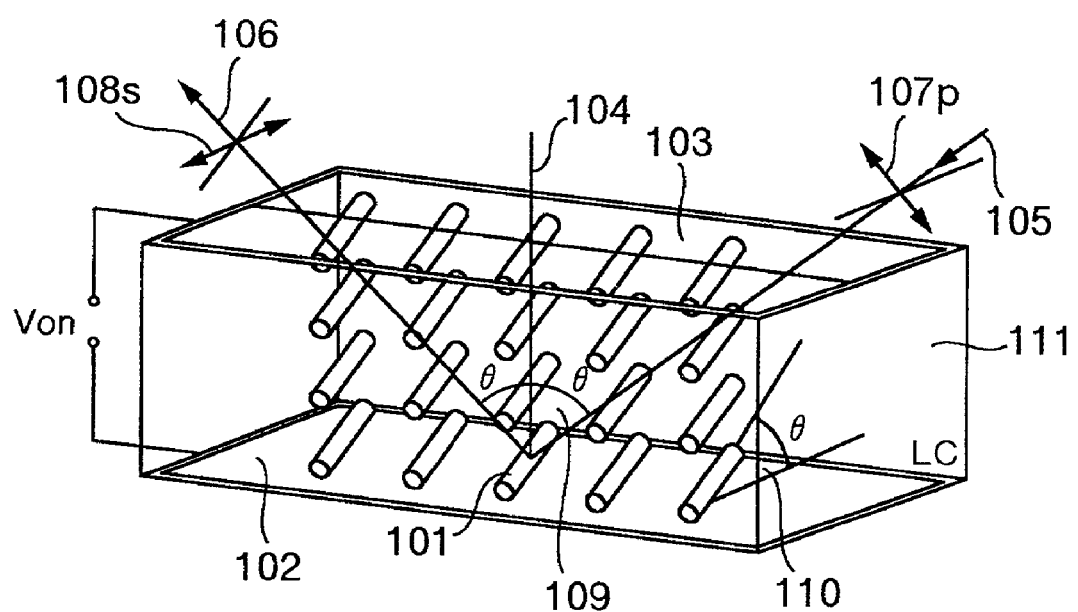

Referring to FIGS. 1a and 1b which are views for explaining the principle of a liquid crystal display element according to the present invention, explanation will be made of the liquid crystal element. Liquid crystal molecules 101 is held between a reflection substrate 102 and a transparent substrate 103 so as to constitute a liquid crystal layer 111. The orientated state of the liquid crystal molecules 101 is substantially parallel to the substrates, and is homogenous, having a twist angle of about 0. The liquid crystal molecules 101 are oriented being slightly inclined with respect to the substrates, that is, it has the so-called pre-tilt angle. The direction of orientation of the liquid crystal molecules is given by the longitudinally axial direction of an image obtained by projecting the liquid crystal molecules onto the reflection substrate 102 or the transparent substrate 103. FIG. 1a shows a state in which a voltage around 0 Vrms is applied between the reflection substrate 102 and the transparent substrate 103, and FIG. 1b shows a state in which a predetermined voltage is applied between the reflection substrate 102 and the transparent substrate 103 so that the angle $\theta_{LC}$ of the liquid crystal molecules with respect to the substrates is changed from the state shown in FIG. 1a.

Either of the optical axis of an incident beam 105 and the optical axis of an emergent beam 106 is present in a plane which is orthogonal to the direction of orientation of the liquid crystal molecules, and makes a predetermined angle θ (109) with respect to a direction normal to the reflection substrate 102. The polarized state of the incident beam is p-polarization or s-polarization with respect to the transparent substrate 103. The polarized state 107p of the incident beam shown in FIG. 1a is p-polarization.

If no voltage is applied to the liquid crystal layer or if the applied voltage is extremely low, birefringence is small since the anisotropy with respect to the polarization of the incident beam is relatively small, and accordingly, the polarized state of the incident light beam is substantially maintained on the emergent side. In this case, since the cross Nicol configuration is taken as mentioned above, the emergent beam is absorbed so as to effect a dark expression (black expression) if a polarizing plate is used as a polarizing element on the emergent side. Meanwhile, if a voltage is applied to the liquid crystal layer, the liquid crystal molecules are inclined ($\theta_{LC}$ (110) is increased), as shown in FIG. 1b, so as to cause anisotropy with respect to the incident polarization, and accordingly, the birefringence varies so as to modulate the polarized state of the incident beam, resulting in a change in the volume of light passing through the polarizing plate on the emergent side. As the voltage applied to the liquid crystal layer is increased, the volume of light passing through the polarizing plate on the emergent side is changed, and accordingly, a maximum transmission rate is exhibited at a predetermined drive voltage. As mentioned above, this display system is a normally black type which can effect a dark expression if no voltage is applied to the liquid crystal layer or if the applied voltage is extremely low, but can effect a bright expression at a predetermined voltage.

(Embodiment 1)

Figure 2:
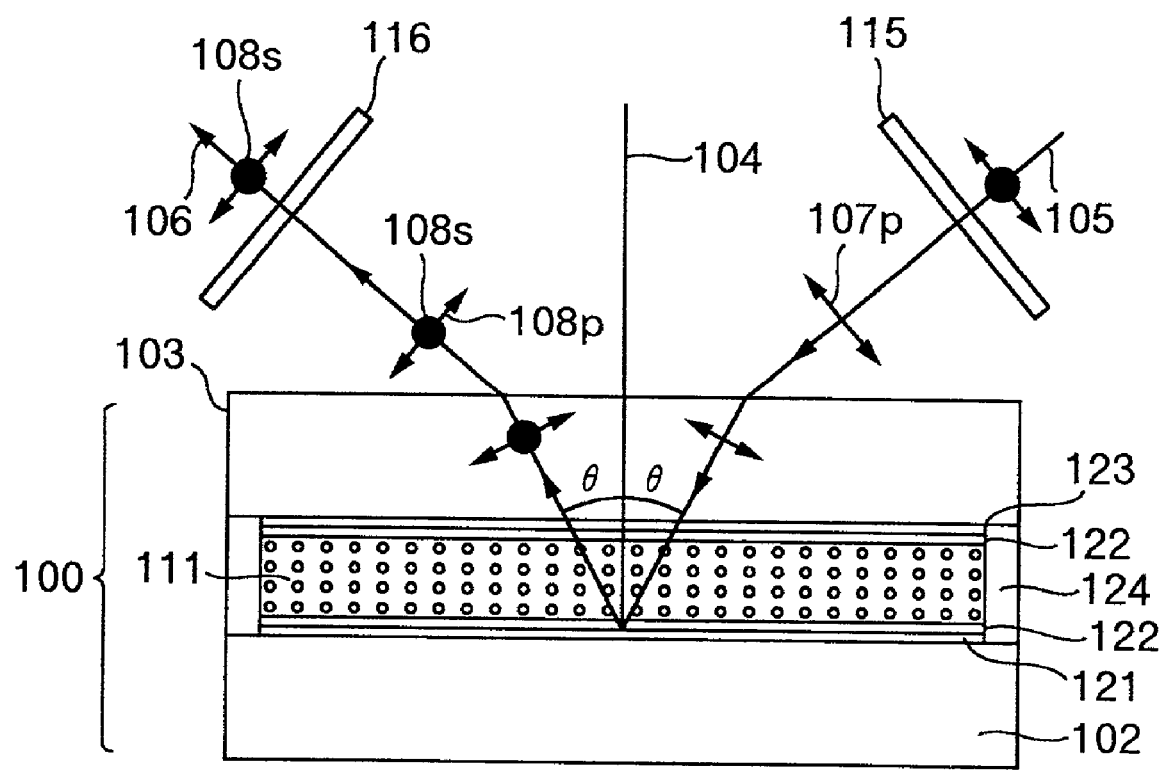
FIG. 2 is a view for explaining an embodiment of in such a case that an irradiation beam is incident upon a panel from the atmospheric air.

FIG. 2 is a view for explaining an embodiment in such a case that the an irradiation beam is incident upon the panel 100 from the air. The panel 100 is composed of a reflection substrate 102 incorporating a reflection electrode 121 and a transparent substrate 103 incorporating a transparent electrode 123, and a liquid crystal layer 111 interposed therebetween. The liquid crystal layer and the substrates incorporate therebetween orientation films 122 for controlling the orientation of the liquid crystal molecules. Further, a seal zone 124 for enclosing the liquid crystal, and the like are provided around the panel.

A polarizing element 115 such as a polarizing plate or a polarization changing element is provided on the optical axis 105 of the incident beam impinging upon the panel 100 so that the incident beam is set to p-polarization or s-polarization beforehand before it impinges upon the panel 100. The polarization after transmission through the polarizing element 115, that is, a p-polarization component 107p at this stage impinges upon the transparent substrate 103 under the Snell'є law as to the interface between the transparent substrate 103 and the air. At this time, the angle between the normal line 104 to the panel 100 and the incident beam or the emergent beam in the liquid crystal layer 111 will be denoted as θ.

The optical path spans between adjacent pixels, and accordingly, the brightness of the boundary between the pixels is affected by both pixels so that the boundary can be made to be blurry. Thus, the boundary of the outline of an object to be displayed can be softly displayed, and accordingly, preferable display can be made.

Figure 3:
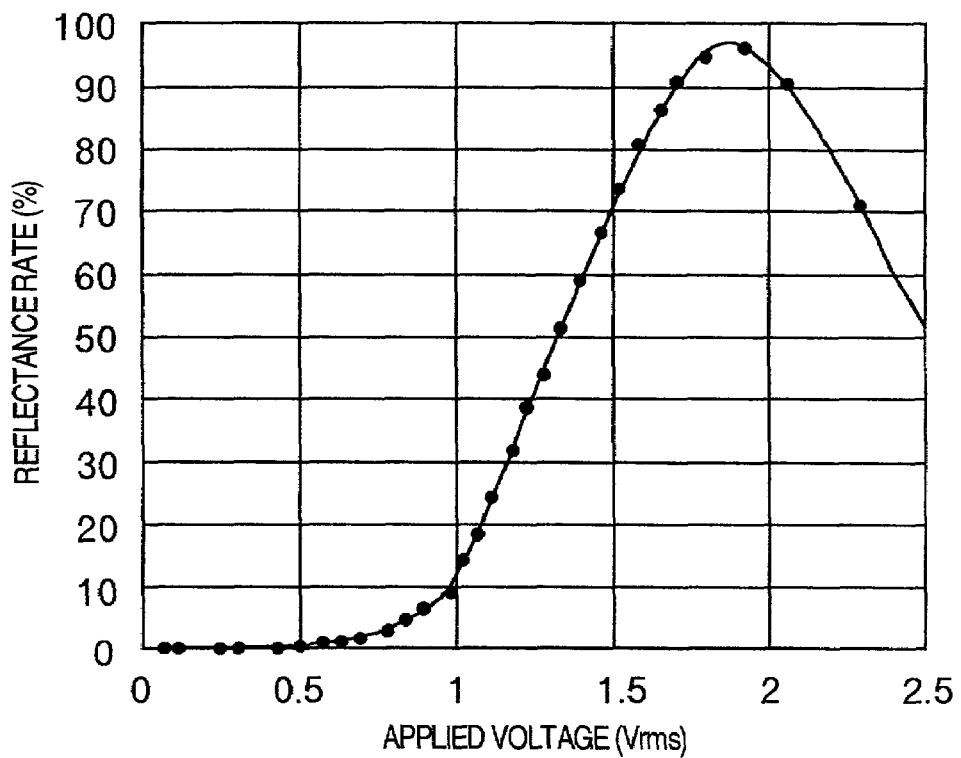
FIG. 3 is a view showing a result of measurement for the dependence of the reflectance rate of the liquid crystal display element, upon a voltage applied to a liquid crystal layer.

FIG. 3 shows a result of measurements of dependency of the reflectance ratio of the element upon a voltage applied to the liquid crystal layer. There is obtained such a normally black characteristic that the reflectance ratio becomes substantially 0% upon application of no voltage, but becomes a maximum reflectance ratio upon application of a low drive voltage around 1.8 Vrms.

In a conventional liquid crystal display system having a twist-nematic mode or the like which is used in general, a desired phase modulation is made for an incident beam by switching the inclined angle of liquid crystal molecules between substantially 0 deg. and 90 deg. with respect to the substrate so as to effect brightness modulation in combination with a polarizing plate. A relatively high voltage, that is, several volts are required in order to set the inclination angle of the liquid crystal molecules to 90 deg. with respect to the substrate. This fact causes the drive voltage of the conventional liquid crystal display system to be high. Meanwhile, according to the present invention, the inclined angle of the liquid crystal molecules which is required for obtaining a desired phase modulation is about 45 deg. with respect to the substrate. A voltage of about 2 volts is satisfactory for inclining the liquid crystal molecules by an angle of about 45 deg. with respect to the substrate, and accordingly, the liquid crystal display system according to the present invention can greatly reduce the drive voltage in comparison with the conventional liquid crystal display system.

Further, in the liquid crystal element incorporating a liquid crystal display system according to the present invention, since the orientation of the liquid crystal is homogeneous, the liquid crystal response time is short, and in other words, it exhibits such a feature that a high speed liquid responsive characteristic is incorporated.

(Embodiment 2)

Figure 4:
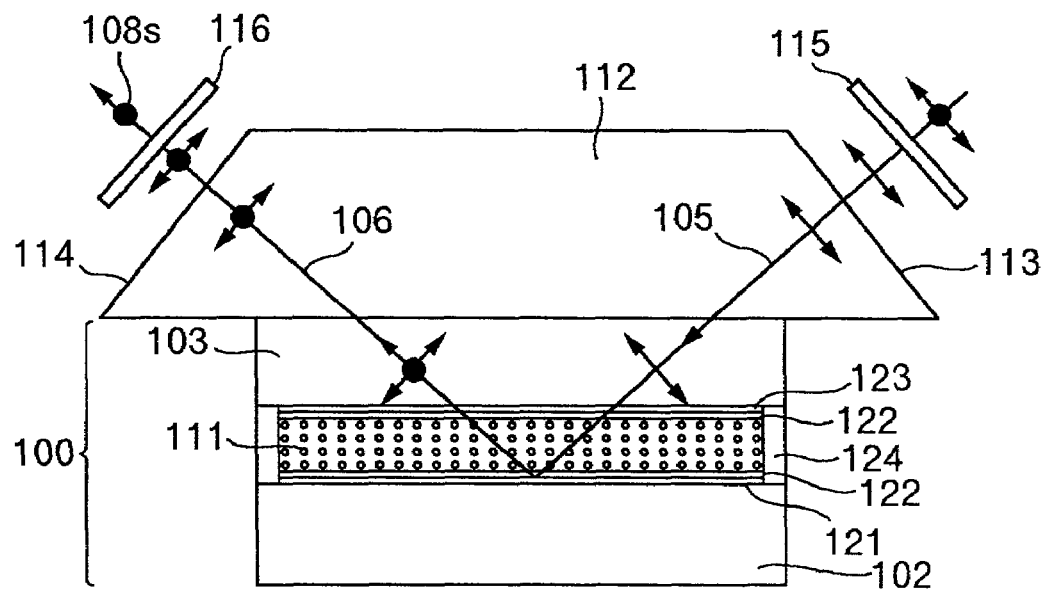
FIG. 4 is a view for explaining an embodiment of an optical system for making the incident angle of the irradiation beam onto the liquid crystal display panel, substantially equal to the incident angle thereof onto the liquid crystal layer.

FIG. 4 is a view which shows an embodiment of an optical system wherein the incident angle of an irradiation beam to the panel 100 is set to be substantially equal to the incident angle thereof to the liquid crystal layer. The incident beam is beforehand set to p-polarization or s-polarization, and then is caused to impinges upon a prism. In order to make incident angle of the incident beam upon the panel 100 equal substantially to the incident angle to the liquid crystal layer, there is used a trapezoidal hexahedron prism consisting of opposed parallel side surfaces, and the other four side surfaces which are square or rectangular.

In such a case that light is caused to directly impinge upon the panel 100 from the air without using the above-mentioned prism, the light is reflected at the outer surface of the panel, and accordingly, the volume of light entering into the panel is greatly reduced. In particular, should light be caused to enter into the panel at an angle exceeding a Brewster angle at the interface between the air and a member such as a glass substrate constituting the panel, the loss of the light volume due to the above-mentioned reflection becomes larger. With the use of the above-mentioned prism, the loss of the light volume due to the reflection upon entering of the light into the panel 100 can be greatly reduced. By adjusting the angles of the trapezoidal shape of the prism and the length of the bottom side thereof, the incident beam can be incident upon the incident surface of the prism, substantially perpendicularly thereto, or in a direction which is substantially orthogonal to the normal line of the panel 100, and the distance therebetween can be optionally adjusted.

Alternatively, in the case of no use of the above-mentioned prism, the angle of the optical axis at the panel-air interface includes a total reflection angle in such a case that light exits from the panel into the air, and accordingly, the angle of the optical axis in the panel cannot be set to a value which exceeds the total reflection angle. With the use of the above-mentioned prism, the angle of the optical axis in the panel can be set to a value which exceeds the total reflection angle.

The shape of the prism should not to be limited to the above-mentioned hexahedron shape, but it goes without saying that any other shapes may be used if the incident angle of the incident beam upon the panel 100 can be made to be substantially equal to the incident angle to the liquid crystal layer.

(Embodiment 3)

Figure 5:
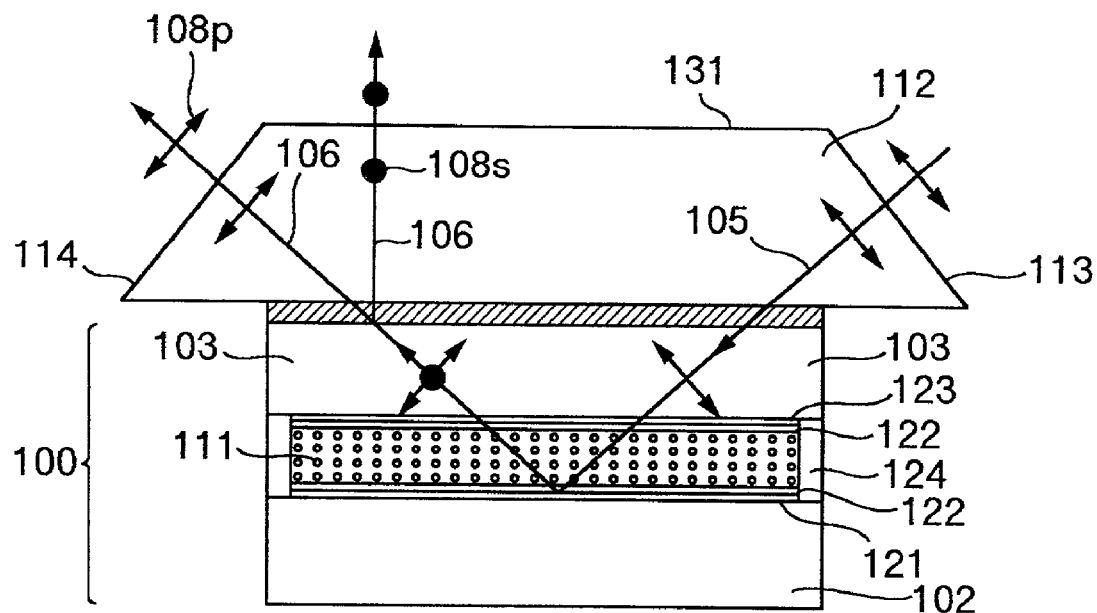
FIG. 5 is a view for explaining an embodiment of an optical system using a hologram element.

FIG. 5 is a view for explaining an embodiment of an optical system using a reflection surface 130. The reflection surface 130 is used for causing the beam 106 which has been subjected to phase modulation by the panel 100 to diffract so as to exit the panel 100 in a direction which is substantially normal to the panel 100. In order to prevent image light from being blurry due to a wavelength dependency of the reflection surface 130, it is desirable to set the distance between the liquid crystal layer 111 and the reflection surface 130 to a value which is as small as possible. Accordingly, Referring to FIG. 5, although the reflection surface 130 is positioned between the panel 100 and the prism 112, it is more preferable to position the reflection surface 130 in the panel 100. Specifically, since it is difficult to form a transparent electrode 123 and an orientation film 122 direct on the reflection surface 130, for example, an extremely thin glass plate is interposed between the transparent electrode 123 and the reflection surface 130, and further, in order to ensure the strength of the substrate, the glass plate is laminated on a hologram element.

The incident beam upon the panel 100 is set to p-polarization. Designing is made such that the reflection surface 130 does not diffract the incident beam which is incident thereupon at a specific angle with respect to p-polarization but do with respect to s-polarization. A p-polarization component of the emergent beam emitted from the panel after phase modulation by the liquid crystal layer, is not diffracted by the reflection surface 130, and is directed to a first emergent surface 114 of the prism, but an s-polarization component thereof is diffracted by the reflection surface 130, and is directed to a second emergent surface 131 of the prism. Since the reflection surface 130 slightly diffract also the p-polarization component, the light diffracted by the reflection surface slightly contains the p-polarization component in addition to the s-polarization component. Accordingly, although not shown in FIG. 5, in order to remove the p-polarization component in the light diffracted by the reflection surface 130, it is more preferable to provide a polarizing plate at a position after the second emergent surface 131 of the prism since the contrast ratio thereof can be enhanced. With the use of the polarizing characteristic and the diffractive characteristic of the reflection surface 130, the beam emitted from the liquid crystal layer 111 in a direction oblique to the normal line of the panel is modulated for the emergent direction by a polarized condition, and simultaneously, the s-polarization component 108s used as the image light is emitted substantially in the direction of the normal line of the panel 100.

(Embodiment 4)

Figure 6:
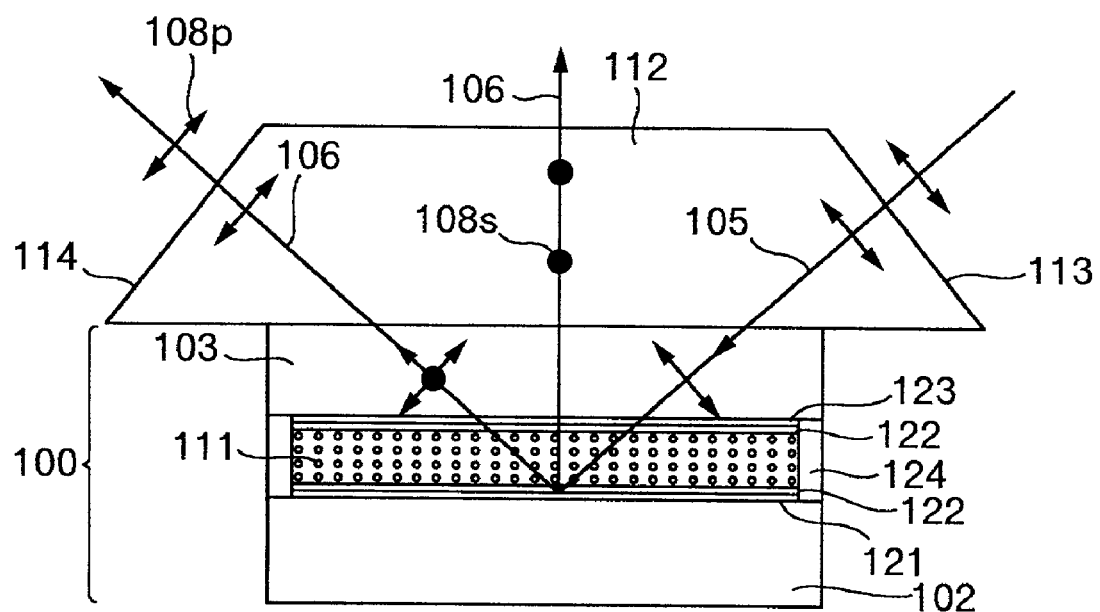
FIG. 6 is a view for explaining an embodiment of an optical system in which diffraction grating is formed on a pixel electrode.

FIG. 6 is a view for explaining an embodiment in which a diffraction grating is formed on the reflection electrode 121. The diffraction grating on the reflection electrode 121 diffracts only s-polarization component 108s which has been modulated in the liquid crystal layer into a direction perpendicular to the panel 100 while it causes the p-polarization component 108p to exit in the direction of the regular reflection of the reflection electrode 121. In combination with the so-called Schlieren optical system adapted to take thereinto only a part of the emergent light from the panel, which falls in a predetermined angular range, the projection optical system can be constituted. In this system, the optical path length in the liquid crystal layer becomes a half, it is required to double the product between the thickness of the liquid crystal layer and the refraction anisotropy of the liquid crystal material. With the provision of the pixels for respective RGB, the wavelength of the beam which is diffracted into in a direction perpendicular to the panel 100 at the diffraction gratings of the respective pixels is set to that of the R, G or B, and with the combination of the Schlieren optical system, a full color display can be made with the use of a single panel.

(Embodiment 5)

Figure 7:
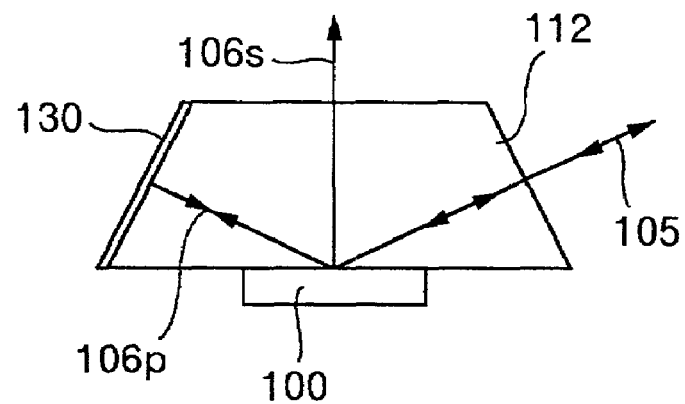
FIG. 7 is a view for explaining an embodiment of an optical system in which a high reflectance metal such as aluminum or silver is coated on an emergent side surface of a hexahedron prism.

FIG. 7 is a view for explaining an embodiment 5. The emergent side surface of a hexahedron prism 112 is coated thereover with a high reflectance metal such as aluminum or silver so as to obtain a reflection surface 130. With this arrangement, the following advantage can be obtained: Incidentally, a Brown tube has the so-called peak brightness function which can increase the white brightness of a bright white image contained in a dark image in part, to a value higher than that of a normal white brightness in order to effectively exhibit an image which has a high brightness ratio within a screen which displays a light which shines in dark, an ocean on which the sunlight is brilliant or the like. However, with a conventional liquid crystal display unit, the materialization of the peak brightness has been difficult since the maximum brightness of the liquid crystal display is limited by the brightness of a light source.

With this arrangement, the light from the dark image part is returned to the panel 100 by means of the reflection surface and is reused for the white image part. In comparison with a white brightness of an image which is bright in its entirety, the white brightness can be increased in the dark image. That is, the peak brightness can be materialized.

(Embodiment 6)

Figure 8:
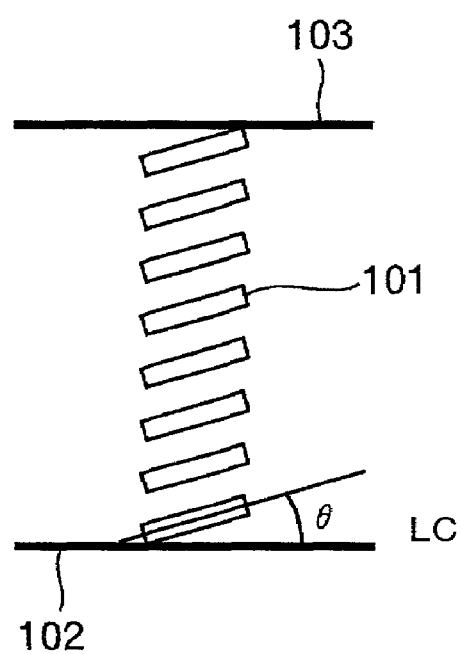
FIG. 8 is a view for explaining a pre-tilt angle which is a tilt angle of liquid crystal molecules at an interface with respect to a substrate.

FIG. 8 shows a pre-tilt angle θLC which is an inclination angle of the liquid crystal molecules at the interface with respect to the substrate. If the pre-tilt angle θLC is excessively small, there is raised such a problem that the orientation of the liquid crystal molecules mainly at the boundary between the pixels is disturbed by a transverse electric field between pixels. The degree of disturbance of the orientation of the liquid crystal molecules is different among the pixels, and accordingly, the homogeneity of the image is deteriorated. Further, in a condition in which the transverse electric field between the pixels is small, the orientation which has been disturbed is returned into its original state, the time constant until it has been returned, is extremely long in comparison with the time constant of response of the liquid crystal molecules in its normal range, and accordingly, it is recognized as image deterioration in the image due to a response lag. In order to solve these problems, a method of applying a sufficient pre-tilt angle $\theta_{LC}$ to the crystal molecules is highly effective. However, in this system, since the degree of birefringence with respect to the incident polarization increases as the pre-titl angle is increased even though no voltage is applied, the black brightness cannot be lowered so that the contrast ratio is decreased.

This problem can be solved as follows; The optical axis of the incident polarization and the optical axis of the emergent polarization are slightly inclined from a direction perpendicular to or parallel with the substrate in accordance with the pre-tilt angle of the liquid crystal molecules so that the degree of birefringence of the incident polarization can be decreased. Accordingly, the black brightness can be lowered. Thus, the contrast ratio can be greatly increased. As to parameters which determine deviations of the angles of the optical axis of incident polarization and the optical axis of emergent polarization, in addition to the pretilt angle $\theta_{LC}$ of the liquid crystal molecules, there may be exemplified an incident angle of incident polarization and a difference in the incident angle dependency of the reflectance ratio between the s-polarization and p-polarization, which is cased by a material of the reflection plate in the case of the reflection type system. The deviations of the angles of the optical axis of the incident polarization and the optical axis of the emergent polarization can be determined empirically.

Specifically, it is sufficient to adjust the optical axis of the incident polarization and the optical axis of emergent polarization so as to decrease the black brightness in a condition in which the voltage applied to the liquid crystal is set to about 0 Vrms. More specifically, the optical axis of the incident side polarizing plate and the optical axis of the emergent polarizing plate are rotated so as to adjust them.

(Embodiment 7)

Figure 9A:
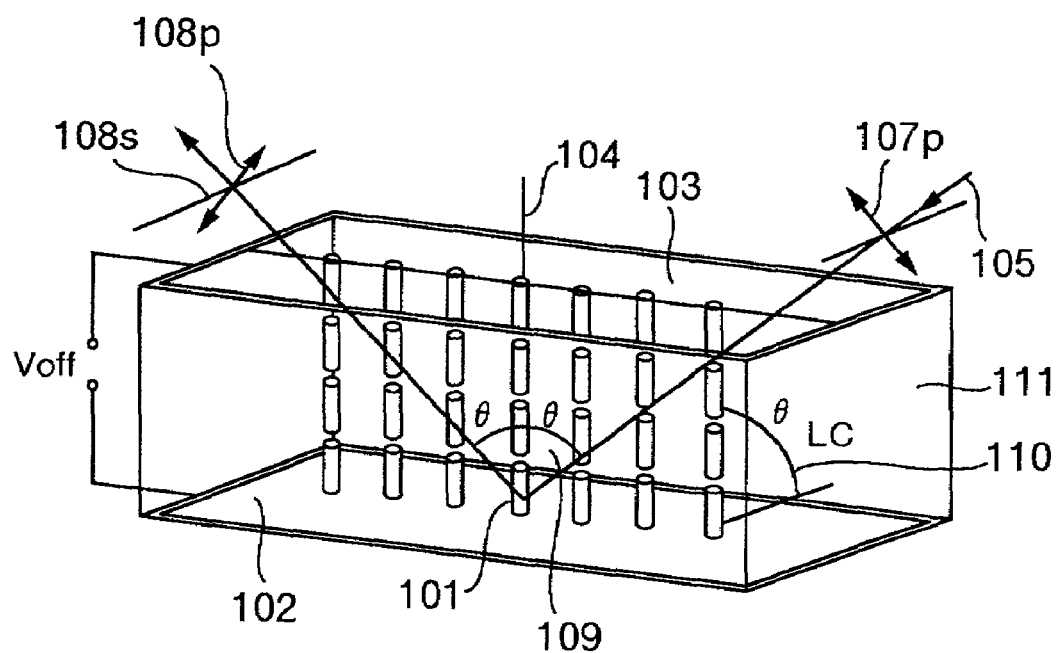
FIGS. 9a and 9b are views for explaining such a case that vertical orientation is used as liquid crystal molecular orientation in a liquid crystal element according to the present invention.
Figure 9B:
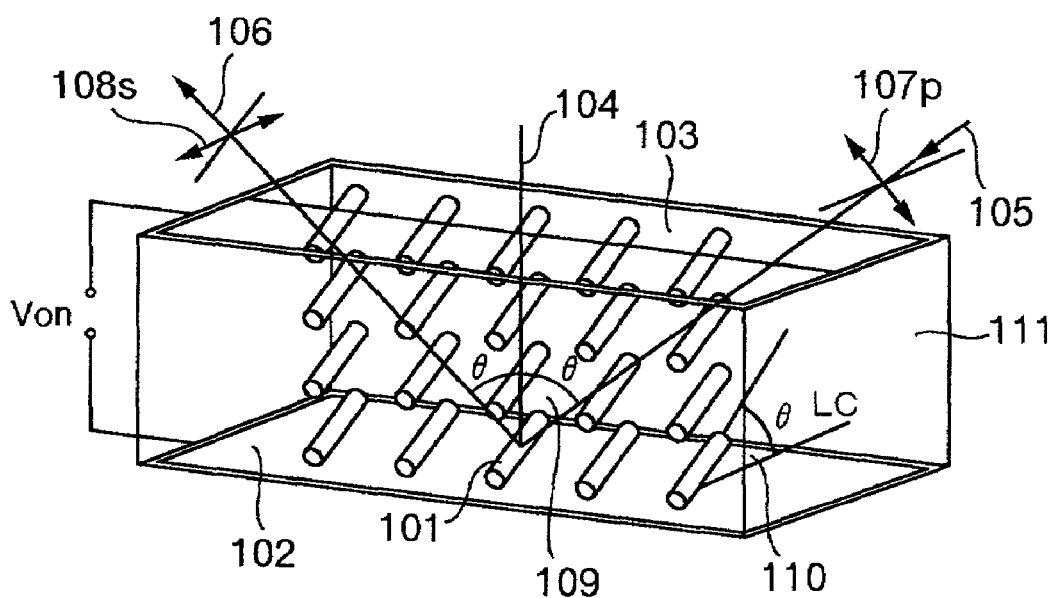

Referring to FIGS. 9a and 9b, explanation will be made of an embodiment in which a perpendicular orientation is applied as the orientation of liquid crystal in the liquid crystal display element according to the present invention. Liquid crystal molecules 101 are interposed between a reflection substrate 102 and a transparent substrate 103 so as to constitute a liquid crystal layer 111. In the condition of the orientation of the liquid crystal molecules 101, the twist angle of the liquid crystal molecules is about 0, and the liquid crystal molecules are orientated, substantially perpendicular to the substrates, that is, it is the so-called homeotropic orientation. FIG. 9a shows a condition in which a voltage of about 0 Vrms is set between the reflection substrate 102 and the transparent substrate 103, and FIG. 9b shows a condition in which a predetermined voltage is applied between the reflection substrate 102 and the transparent substrate 103 so that the angle $\theta_{LC}$ of the liquid crystal molecules with respect to the substrates is changed from that shown in FIG. 1. The inclined angle $\theta_{LC}$ of the liquid crystal molecules with respect to the substrate is set to a predetermined angle which is not 90 deg. but is less than 90 deg. in order to cause the inclined angle of the liquid crystal molecules 101 with respect to the substrates to change in a predetermined direction when a voltage is applied between the reflection substrate 102 and the transparent substrate 103. The direction in which the liquid crystal molecules are inclined when a voltage is applied between the reflection substrate 102 and he transparent substrate 103 is the direction of orientation of the liquid crystal in the liquid crystal display element in this embodiment. Either of the optical axis of the incident beam and the optical axis of the emergent beam is present in a plane which is substantially perpendicular to the direction of orientation of the liquid crystal molecules 101, and is set to a predetermined angle θ with respect to the direction of the normal line 104 of the reflection substrate 102. The polarization of the incident beam is p-polarization or s-polarization with respect to the transparent substrate 103. The polarization 107p of the incident beam shown in FIG. 9a is p-polarization.

If the liquid crystal layer is not applied with a voltage or is applied with a substantially low voltage, the birefringence is small since the anisotropy as to the incident polarization is sufficiently small, and accordingly, the polarization of the incident beam is maintained also on the emergent side. In this case, due to the cross-Nicol configuration as mentioned above, the emergent beam is absorbed if the polarizing plate is used as the polarizing element on the emergent side so as to exhibit a dark expression (black expression). Meanwhile, when a voltage is applied to the liquid crystal layer, the liquid crystal molecules are inclined $\theta_{LC}$ is dereased) as shown in FIG. 9b, anisotropy with respect to the incident polarization is caused so that the birefringence changes, and accordingly, the condition of the incident polarization is modulated so that the volume of light passing through the polarizing plate on the emergent side is changed. As the voltage applied to the liquid crystal is increased, the volume of light passing through the polarizing plate on the emergent side is increased, and accordingly, a maximum transparent rate is exhibited at a predetermined drive voltage. As mentioned above, the present display system is a normally black system so that it exhibits a dark expression when no voltage is applied to the liquid crystal layer or when an extremely small voltage is applied thereto, but it exhibits a bright expression when a predetermined voltage is applied thereto.

(Embodiment 8)

Figure 10A:
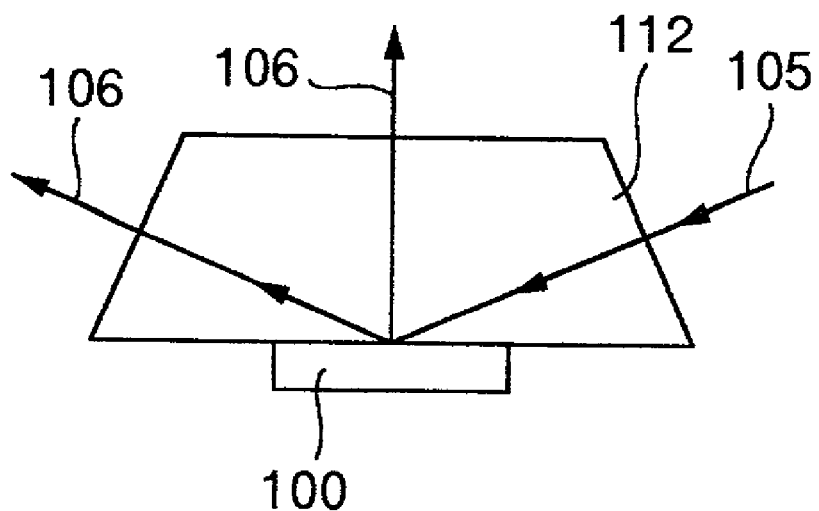
FIGS. 10a and 10b are views for explaining variation in the relationship between the hexahedron prism and an incident beam and an emergent beam.
Figure 10B:
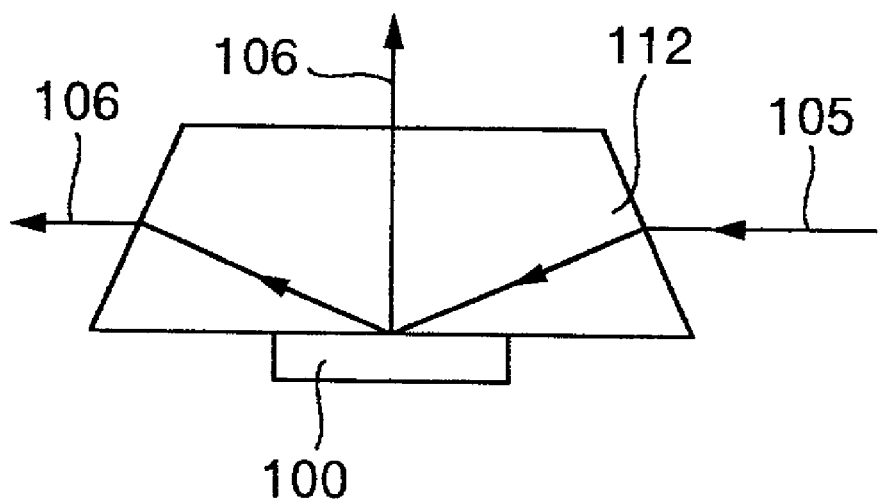

Referring to FIGS. 10a to 10b, explanation will hereinbelow made of variation in the relationship between the hexahedron prism 112, and the optical axis 105 of the incident beam and the optical axis 106 of the emergent beam. FIG. 10a shows such a case that the optical axis 105 of the incident beam is substantially perpendicular to the incident surface of the hexahedron prism 112. Meanwhile FIG. 10b shows such a case that the angle between the optical axis 105 of the incident beam and the incident surface of the hexahedron prism 112 is absolutely equal to a Brewster angle.

(Embodiment 9)

Figure 11:
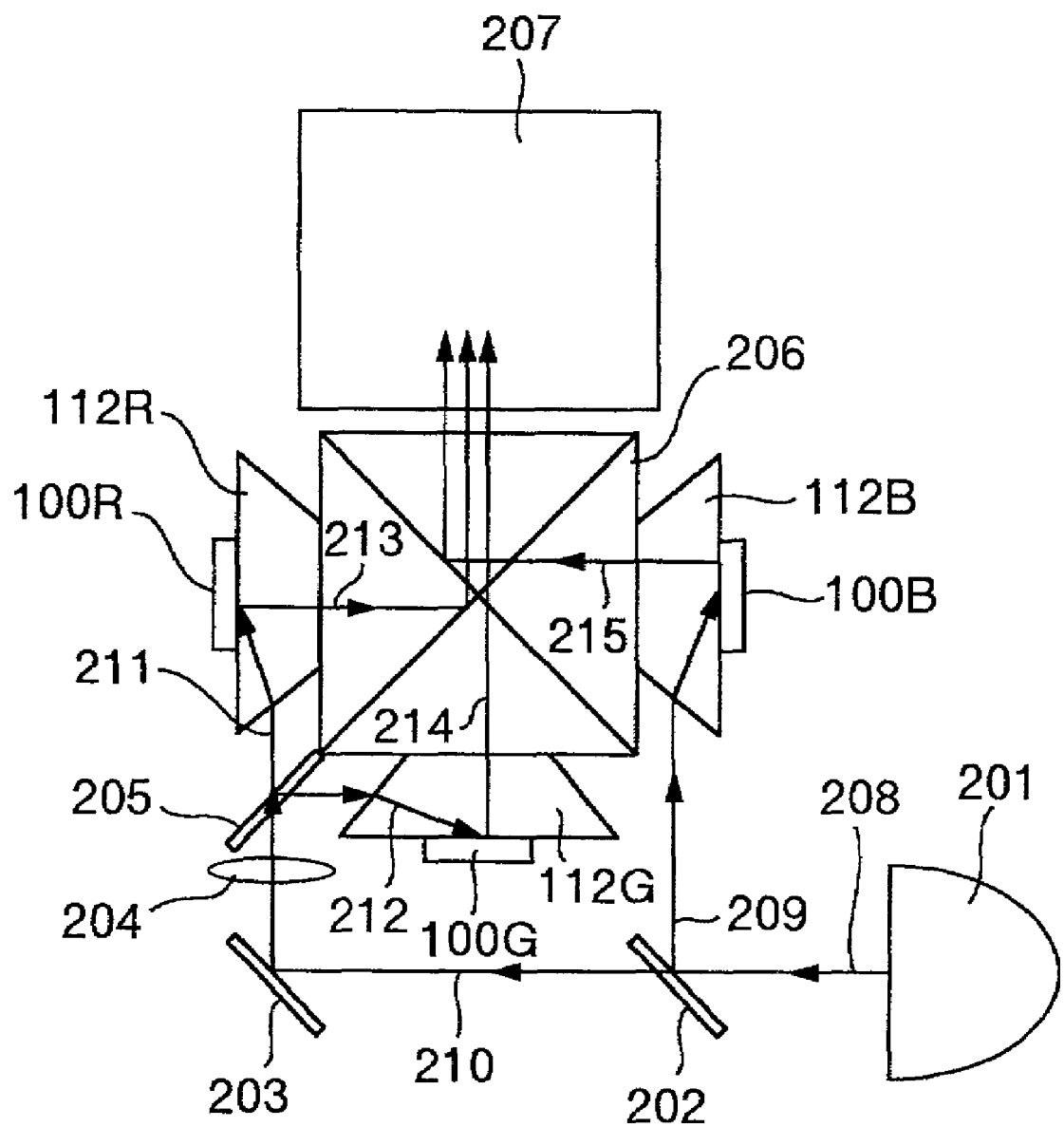
FIG. 11 is a view for explaining an embodiment of a display unit using the liquid crystal element according to the present invention.

FIG. 11 shows a display unit using the liquid crystal display element according to the present invention, for explaining an embodiment of a three panel type projection optical system. The projection optical system in this embodiment is composed of a color separating optical system consisting of a light source 201, dichroic millers 202, 205, a mirror 203 and a lens 204, panels 100R, 100G, 100B for respective three primary colors RGB, a cross-dichroic prism 206, hexahedron prisms 112R, 112G, 112B located between the respective panels 100R, 100G, 100B and, the cross-dichroic prism 206, a projection lens 207, and the like.

A white light beam 208 emitted from the light source 201 is split into a blue light beam 209 and a yellow light beam 210, and the blue light beam 209 is incident upon the panel 100B by way of the hexahedron prism 112B. Meanwhile, the yellow light beam 203 is separated into a red light beam 211 and the green light beam 212 by means of the dichroic mirror 205 through the intermediary of the mirror 203 and the lens 204, which are then incident upon the panels 100R, 100B, respectively.

The incident beams to the panels 100R, 100G, 100B for the respective colors RGB, are arbitrarily phase-modulated at every pixels, and then emanate from the panels 100R, 100G, 100B. At this stage, the optical axes thereof are modulated by the hologram elements so that they emanate in the directions substantially perpendicular to the panels 100R, 100G, 100B respectively. The hexahedron prisms 112R, 112G, 112B are arranged, being opposed to the side surfaces of the cross-dichroic prism 206. The light beams 213, 214, 215 emitted from the panels 100R, 100G, 100B are chromatically synthesized by the cross-dichroic prism 206 and is directed toward the projection lens 207 by which they are projected to the screen.

The emergent beams from the panels 100R, 100G, 100B are emitted in the direction of the normal line of the panels by means of the hologram elements incorporated to the respective panels 100R, 100G, 100B, and accordingly, it is not necessary to excessively decrease the F-value of the projection lens 207, thereby it is possible to miniaturize the liquid crystal display unit. Further, this technical effects can use a small-sized prism as the cross-dichroic prism 206, thereby it is possible to contribute to reduce the weight and size of the optical system in its entirety.

It is desirable to provide an absorber for unnecessary light or an optical system for guiding unnecessary light into an absorber at emergent surfaces of the respective hexahedron prisms 112R, 112G, 112B. With this arrangement, generation of stray light can be effectively prevented, and lowering or the contrast ratio can be prevented. Alternatively, as stated in the embodiment 5, the emergent side surfaces of the hexahedron prisms 112R, 112G, 112B are made to be reflective, and the light returned to the panels 100R, 100G, 100B is reused, thereby it is possible to enhance the peak brightness. Referring to FIG. 11, although the directions which are parallel with the long side directions of the panels 100R, 100G, 100B and the directions parallel with the mating surfaces of four prisms in the cross-dichroic prism 206 are arranged in parallel with each other, the directions may be made to be parallel with the short side directions of the panels 100R, 100G, 100B.

In this embodiment, the three panel type projection optical system has been explained. Meanwhile, as stated in the embodiment 1, the liquid crystal display system according to the present invention incorporates a high speed liquid crystal response characteristic. With the use of this characteristic, it is also possible to constitute a field sequential color type display unit with the use of a single panel.

(Embodiment 10)

Figure 12:
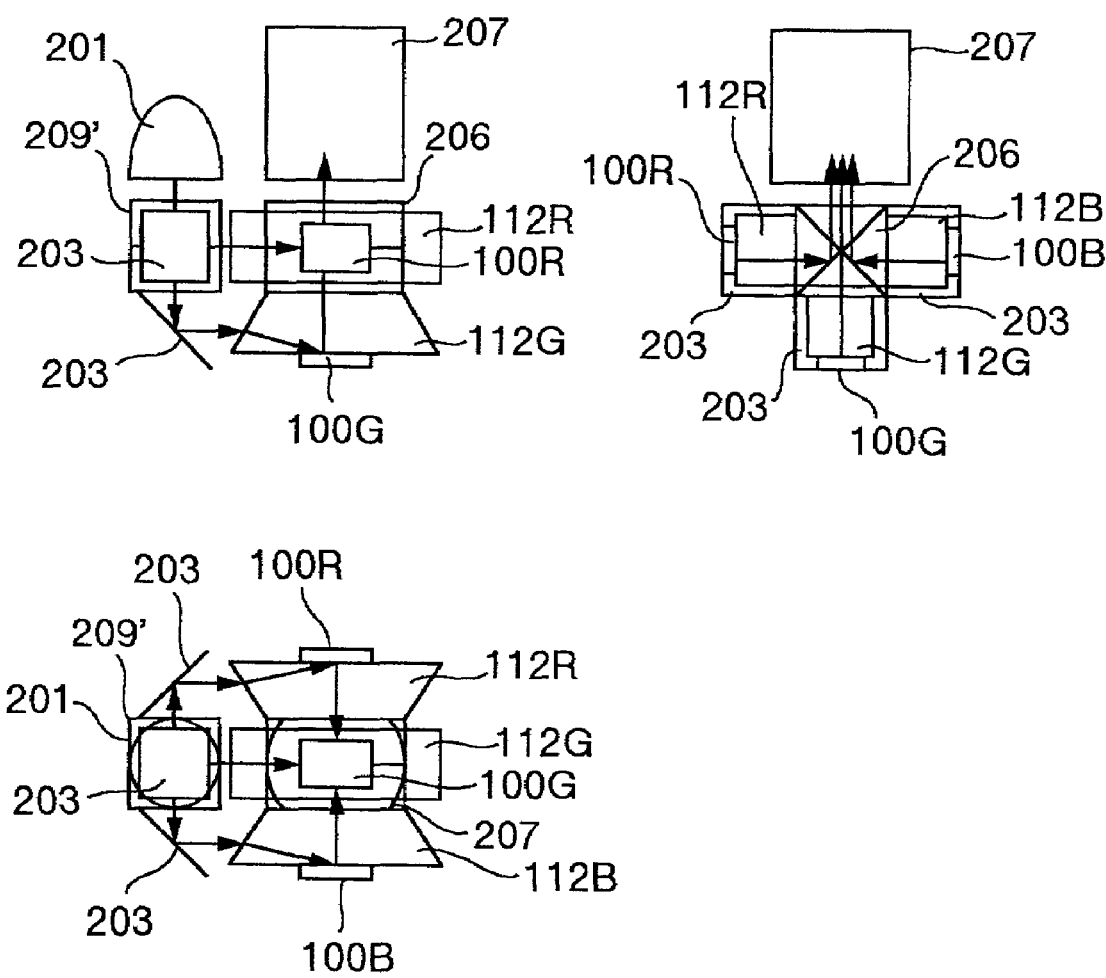
FIG. 12 is a view for explaining another embodiment of a display unit using the liquid crystal element according to the present invention.

FIG. 12 is a view for explaining another embodiment of the three panel type projection optical system, using a single cross-dichroich prism. In the projection optical system in this embodiment, a white light beam from a light source 210 is chromatically separated into RGB by a first cross-dichroic prism 209', the light beams of RGB are emitted from the first cross-dichroic prism 209' in three directions, respectively, and the respective light beams are guided by means of a mirror 203 to hexahedron prisms 112R, 112G, 112B, and are then irradiated to the panels 100R, 100G, 100B. The light beams of the respective colors modulated in the panels 100R, 100G, 100B are chromatically synthesized by a second cross dichroic prism 206, and are projected to a screen through the intermediary of a projection lens 207. The incident side cross-dichroich prism 209' and the emergent side cross-dichroich prism 206 are used so that their cut-off wavelengths with respect to the incident side p-polarization are different from each other. In other words, the cut-off wavelength with respect to the incident side p-polarization is preferably set to be equal to the cut-off wavelength of the emergent side s-polarization. If they are not equal to each other, light which should inherently pass through the emergent side cross-dichroich prism 206 is reflected so as to cause a loss in the light volume, and as well cause light to enter different panels simultaneously so as to produce stray light, thereby it is possible to cause a problem of lowering the contrast ratio.

(Embodiment 11)

Figure 13:
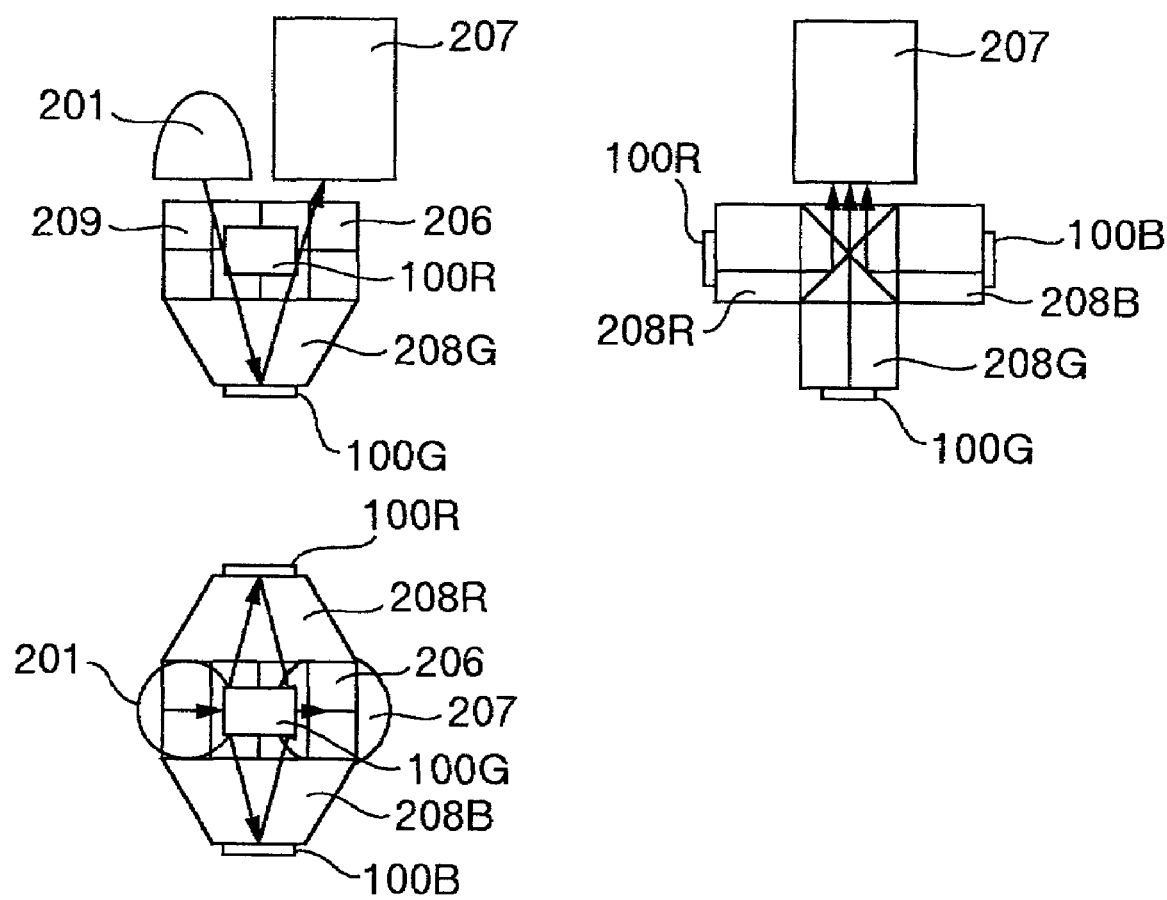
FIG. 13 is a view for explaining another embodiment of a display unit using the liquid crystal element according to the present invention.

FIG. 13 is a view for explaining another embodiment of the three panel type projection optical system, using two cross-dichroich prisms. In the projection optical system in this embodiment, a white light beam from a light source 210 is chromatically separated into RGB by a first cross-dichroic prism 209', the light beams of RGB are emitted from the first cross-dichroic prism 209' in three directions, respectively, and are entered into the panels 100R, 100G, 100B, oblique to the latter. At this stage, in order to maintain the incident angles of the incident beams from the light source 201 to the panels 100R, 100G, 100B, prisms 208R, 208G, 208B are arranged between the panels 100R, 100G, 100B and the cross-dichroich prisms 209', 206. The emergent beams from the panels 100R, 100G, 100B are chromatically synthesized, and are projected to a screen by means of the projection lens 207.

(Embodiment 12)

FIGS. 15 to 18 is a view for explaining an embodiment of a three panel type projection optical system which is a display unit using the liquid crystal display element according to the present invention. The projection optical system in this embodiment is composed of a color separating optical system consisting of a light source 201, dichroic mirrors 202, 205, a mirror 203 and a lens 204, panels 100R, 100G, 100B for respective three primary colors RGB, a cross-dichroic prism 206, hexahedron prisms 112R, 112G, 112B located between the respective panels 100R, 100G, 100B and, the cross-dichroic prism 206, a projection lens 207, and the like.

The optical axis of the light source 20 and the optical axis of the projection lent 207 are laid in parallel with each other. The optical axis of the light source 201 and the optical axis of the projection lens 207 may be arranged in parallel with each other at different levels, and may be twisted from each other by an angle of about 90 deg. In the case of application to a front projector, projection is made in an obliquely upward direction, the optical axis of the projection lens may be offset from the optical axes of the panels with a shift degree of 10:0 or 9:1.

The display device includes the light source 201 which may be a white light lamp such as an ultra high pressure mercury lamp, a metal halide lamp, a xenon lamp, a mercury xenon lamp or a halogen lamp.

Light radiated from a bulb in the optical source 201 is focused by an elliptic, parabolic or aspheric reflection surface 130 into a light beam which is then incident upon a first array lens 301. The light beam passes through the first array lens 301, and thereafter, passes through a second array lens 302 and is then incident upon a polarized beam splitter 304. This incident light beam is split by the poloarized beam splitter 304 into a transmitted light beam which is a p-polarized beam, and a reflection light beam which is an s-polarized light beam, and the polarizing direction of the p-polarized light beam is rotated by an angle of 90 deg. by a λ/2 phase difference plate located at the emergent side surface of the polarized beam splitter 304 so as to be turned into an s-polarized light beam which is then incident upon the lens 204. Further, the s-polarized light beam as aforementioned, is repeatedly reflected, is then emitted from the emergent surface of the polarized beam splitter 304, and is then incident upon the lens 204. This lens 204 is composed of not less than at least one of lenses, having a positive refractive power so as to effect further focusing of the s-polarized light beam. The light beam having passed through the lens 204 is irradiated to the dichroic mirror 205.

An emergent polarizing plate 303 which allows the s-polarized light beam to pass therethrough is arranged on the emergent side of the panels 100R, 100G, 100B so as to enhance the degree of polarization. Images formed by the panels 100R, 100G, 100B are magnified and projected by the projection lens 204 to a screen, thus the liquid crystal display unit serves as a magnifying display unit.

The white light beam 208 emitted from the light source 201 is incident upon a cross dichroic mirror 202 which is composed of a blue reflection dichoric mirror and a red reflection dichroic mirror which are arranged being crossed by an angle of about 90 deg. The blue light beam 209 is reflected by the blue reflection dichroic mirror 205 and is then incident upon the mirror 206. Then it is reflected by the mirror 203, and is then incident upon the hexahedron prism 112B. By means of the hexahedron prism 112B, the direction of the emergent light beam is changed from the direction of the incident light beam, and is then emanated therefrom so as to be incident upon the hologram element 130B.

The red light beam 211 is reflected by the red reflection dichroic mirror 205, and is then incident upon the mirror 303 so as to be reflected by the latter. Thereafter, it is incident upon the hexahedron prism 112R. By the hexahedron prism 112R, the direction of the emergent light beam is turned from that of the incident light beam, and the emergent light beam is emanated therefrom so as to incident upon the hologram element 130R.

The green light beam 212 having passed through the cross-dichroich mirror 202, is incident upon the mirror 203 so as to be reflected by the latter, and is then incident upon the hexahedron prism 112G. By the hexahedron prism 112G, the direction of the emergent light beam is turned from that of the incident light beam, and the emergent light beam is then emanated therefrom so as to incident upon the hologram element 130G.

The incident beams to the panels 100R, 100G, 100B for the respective colors RGB, are arbitrarily phase-modulated at every pixels, and then emanate from the panels 100R, 100G, 100B. At this stage, the optical axes thereof are modulated by the hologram elements so that they emanate in the directions substantially perpendicular to the panels 100R, 100G, 100B respectively. The hexahedron prisms 112r, 112G, 112B are arranged, being opposed to the respective side surfaces of the dichroic prism 206. The light beams 213, 214, 215 emitted from the panels 100R, 100G, 100B are chromatically synthesized by the cross-dichroic prism 206 and is directed toward the projection lens 207 by which they are projected to the screen.

The emergent beams from the panels 100R, 100G, 100B are emitted in the direction of the normal line of the panels by means of the hologram elements incorporated to the respective panels 100R, 100G, 100B, and accordingly, it is not necessary to excessively decrease the F-value of the projection lens 207, thereby it is possible to miniaturize the liquid crystal display unit. Further, this technical effects can use a small-sized prism as the cross-dichroic prism 206, thereby it is possible to contribute to reduce the weight and size of the optical system in its entirety.

It is desirable to provide an absorber for unnecessary light or an optical system for guiding unnecessary light into an absorber at emergent surfaces of the respective hexahedron prisms 112R, 112G, 112B. With this arrangement, generation of stray light can be effectively prevented, and lowering or the contrast ratio can be prevented. Alternatively, as stated in the embodiment 5, the emergent side surfaces of the hexahedron prisms 112R, 112G, 112B are made to be reflective, the light returned to the panels 100R, 100G, 100B is reused, thereby it is possible to enhance the peak brightness. Referring to FIG. 11, the directions which are parallel to the long side directions of the panels 100R, 100G, 100B and the directions parallel with the mating surfaces of four prisms in the cross-dichroic prism 206 are arranged in parallel with each other, the directions may be made to be parallel with the short side directions of the panels 100R, 100G, The hologram elements 130R, 130G, 130B are arranged on the optical paths of RGB before the color light beams are incident upon the emergent side cross-dichroich prism 206. In order to enhance the heat resistance, the hologram elements 130R, 130G, 130B may be mated to the emergent side cross-dichroich prism 206. Further, they may be mated to a glass-like member based upon sapphire.

In this embodiment, explanation has be mainly made of the three panel type projection optical system. Meanwhile, as explained in the embodiment 1, the liquid crystal display system incorporates a high speed liquid crystal response characteristic. With the use of this characteristic, it is, of course, possible to constitute a field sequential color type display unit with the use of a single panel.

(Embodiment 13)

Although explanation has been mainly made of the case of the reflection type liquid crystal display element, explanation will be made of a transparent type liquid crystal display element in this embodiment. In the case of the reflection type, the incident light beam is reflected by the reflecting means, and accordingly, it passes through the liquid crystal display layer by two times. Meanwhile, in the case of the transparent type, the incident light beam passes through the liquid crystal layer only by one time. Accordingly, in the case of the transparent type, it is required to set its retardation which is the optical thickness of the liquid crystal layer to a value which is two times as large as that of the reflection type.

Figure 14:
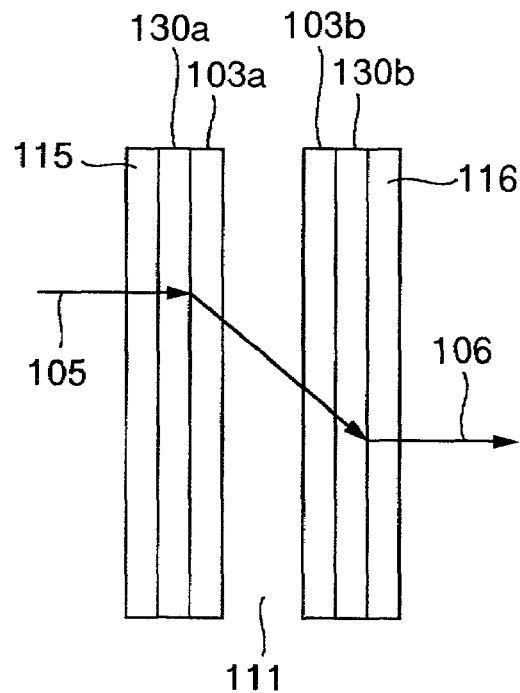
FIG. 14 is a view for explaining an embodiment of a transmission type liquid crystal element according to the present invention.
Figure 15:
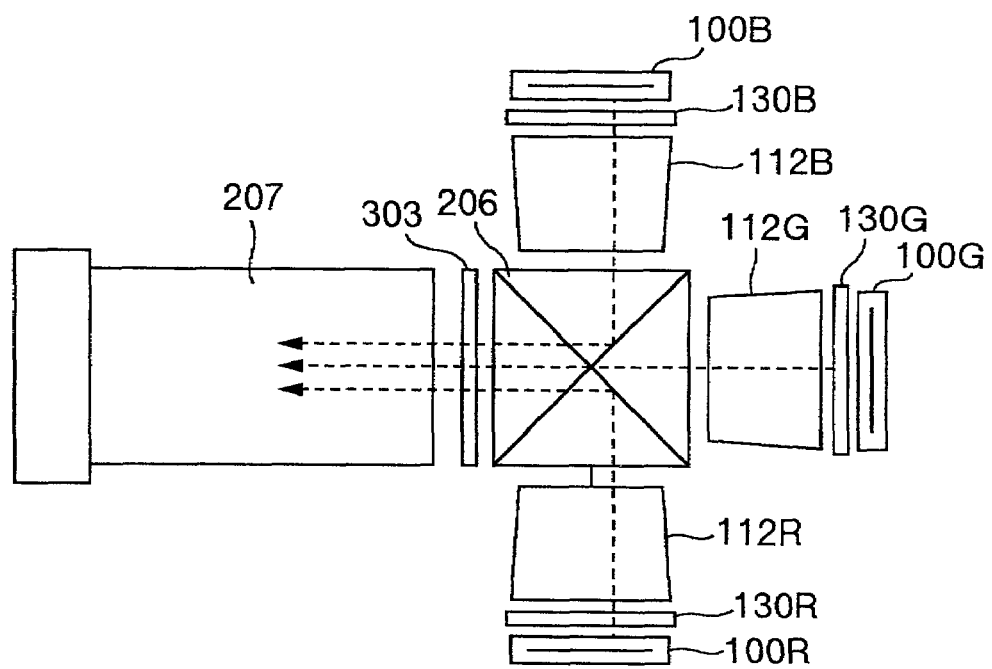
FIG. 15 is a view for explaining another embodiment of a display unit using the liquid crystal element according to the present invention.
Figure 16:
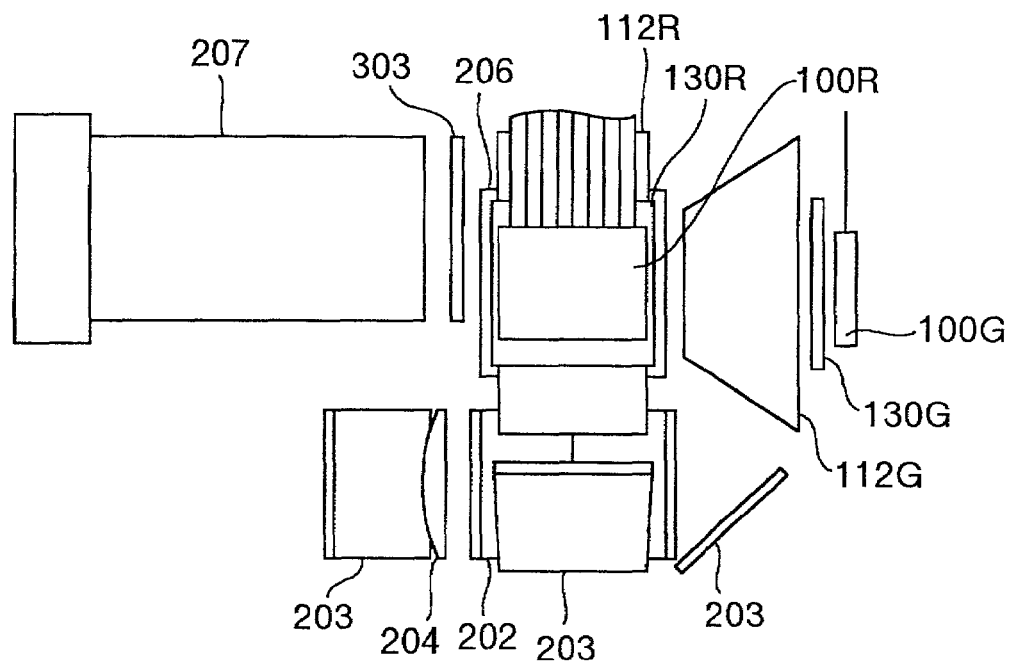
FIG. 16 is a view for explaining another embodiment of a display unit using the liquid crystal element according to the present invention.
Figure 17:
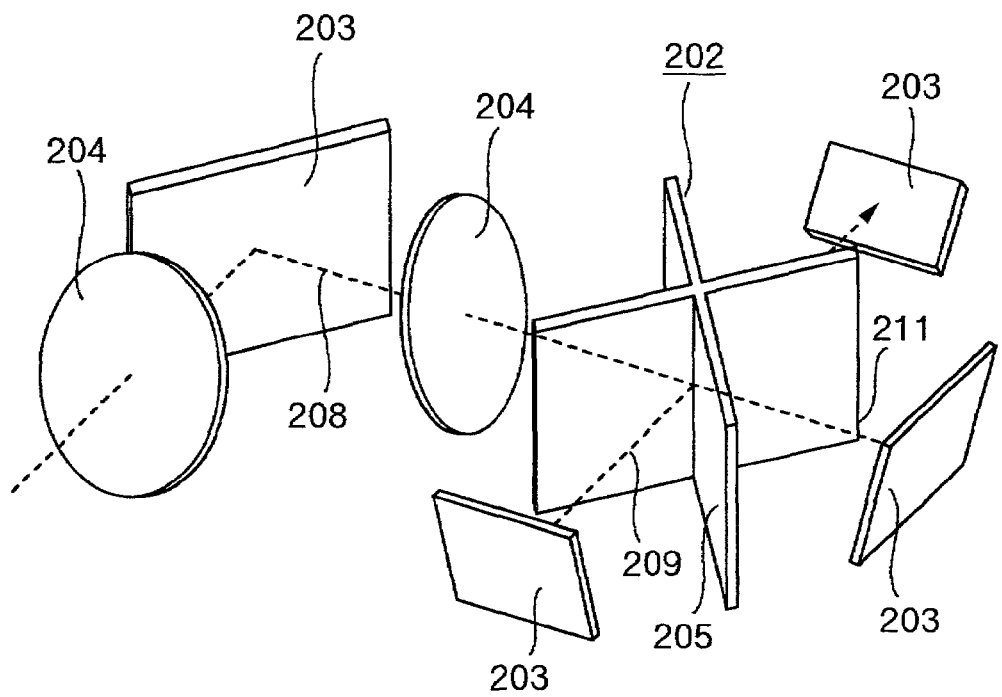
FIG. 17 is a view for explaining another embodiment of a display unit using the liquid crystal element according to the present invention.
Figure 18:
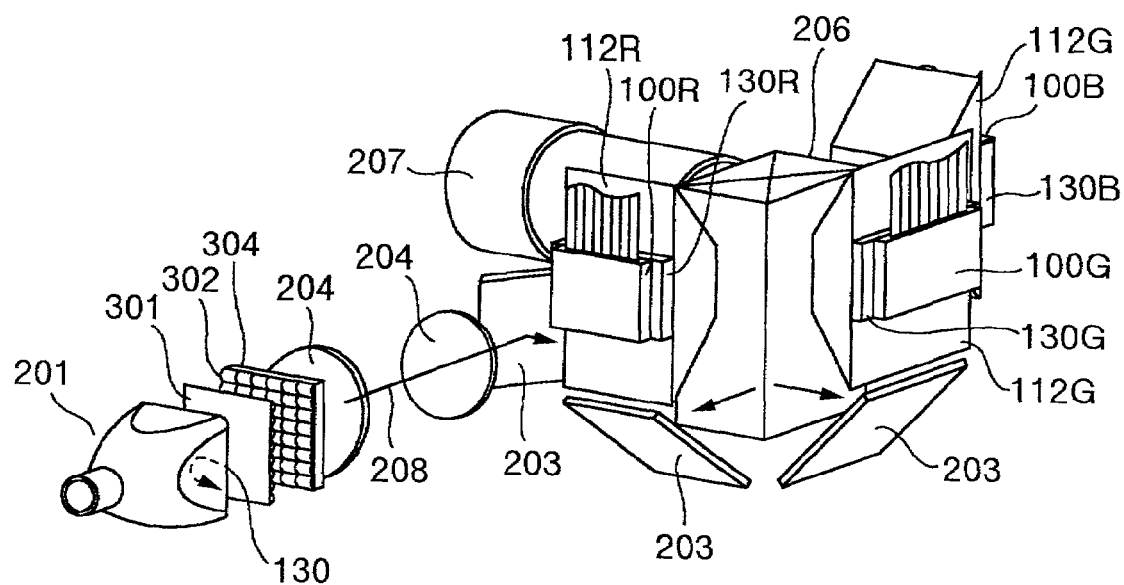
FIG. 18 is a view for explaining another embodiment of a display unit using the liquid crystal element according to the present invention.

FIG. 14 is a view for explaining an embodiment of the transparent type liquid crystal display element which utilizes the liquid crystal display system according to the present invention. The liquid crystal display element in this embodiment is characterized in that it is composed of a liquid crystal layer 111 interposed between at least two transparent substrates 103a, 103b, a polarizer 115, an analyzer 116, and hologram elements 130a, 130b which are interposed respectively between the polarizer 115 and the liquid crystal layer 111, and between the liquid crystal layer 111 and the analyzer 116. The orientation of liquid crystal in the liquid crystal layer 11 in this embodiment, is set to be perpendicular or parallel to the direction of incident polarization. The incident light beam impinging upon a direction substantially perpendicular to the transparent substrate 103a, is diffracted by the hologram element 130a, and accordingly, the incident light beam having the optical axis 105 obliquely impinges upon the liquid crystal layer 111. The light beam emanated from the liquid crystal layer 111 in which the incident light beam has been modulated is diffracted by the hologram element 103b into a direction substantially perpendicular to the transparent substrate, and then passes through the analyzer 116. The hologram element 130a is adapted to diffract the polarized beam passing through the polarizer 115 while the hologram element 130b diffracts the polarized beam passing through the analyzer 116. The polarizer 115 and the analyzer 116 are arranged in a cross-Nicol configuration.

(Embodiment 14)

Although explanation has been mainly made of such a system that the orientation of the liquid crystal molecules is changed in a plane containing the normal line to the two substrates in the panel 100, explanation will be hereinbelow made of a system in which the orientation of liquid crystal molecules is changed in a plane which is in parallel with the substrates constituting the panel 100 in this embodiment. Specific examples of the system in which the orientation of the liquid crystal molecules is changed in a plane parallel with the two substrates constituting the panel 100, are as follows: (1) a system in which switching is made between directions of orientation of the liquid crystal molecules in two states by an electric field component which is mainly parallel to the substrates; (2) a system in which switching is made between directions of orientation of the liquid crystal molecules in two states with the use of a ferroelectric liquid crystal material; and (3) a system in which switching is made between directions of orientation of the liquid crystal molecules in two states with the use of antiferroelectric liquid crystal material.

The optical axis of the incident light beam upon the liquid crystal layer is present in a plane which is substantially perpendicular to one of the directions of the orientation of the liquid crystal molecules in the above-mentioned two states, and the incident light beam impinges upon the liquid crystal layer in a direction inclined by a predetermined angle to the direction of the normal line of the substrate. With this arrangement, in one of the directions of the orientation of the liquid crystal molecules in the two state, the polarization of the incident light beam is not modulated so as to exhibit a black expression, but in the other of directions in the two states, the polarization of the incident light beam is modulated so as to exhibit a white expression. If the system can continuously modulates the direction of the orientation between the directions of the orientation of the liquid crystal molecules in the above-mentioned two states, an intermediate tone expression can be exhibited. Further, discrete directions of the orientation are exhibited between the directions of the orientation of the liquid crystal molecules in the above-mentioned two states as in the case of using a ferroelectric liquid crystal, an intermediate tone expression can be exhibited through pulse width modulation.

In view of the above-mentioned several embodiments, there is provided a liquid crystal display element comprising two substrates at least one of which is transparent and a liquid crystal layer interposed between the two substrates, wherein a plurality of pixels and active elements for driving the liquid crystal layer at the plurality of pixels are provided to at least one of the two substrates, the optical axis of an incident light beam upon the liquid crystal layer is present in a plane which is substantially perpendicular to the direction of orientation of liquid crystal molecules, and the incident light beam impinges upon the liquid crystal layer in a direction which is inclined by a predetermined angle to the direction of the normal line of the substrate. With this configuration, desired phase modulation can be made through a slight motion of the liquid crystal molecules, thereby it is possible to greatly reduce the liquid crystal drive voltage.

The black expression condition is effected in a condition in which phase modulation by the liquid crystal layer is extremely small so that the direction of the orientation of liquid crystal molecules is parallel or perpendicular to the polarizing optical axis of the incident polarization. Accordingly, the black level can be held to be small so as to obtain a satisfactory contrast ratio, and simultaneously, the contrast ratio which is always stable can be materialized since the wavelength dependency and the temperature dependency of the black level are small. Further, since the viewing angle characteristic in the plane orthogonal to the direction of the orientation of the liquid crystal molecules is satisfactory, the F value in the projection display unit can be reduced so as to maintain a high contrast ratio, thereby it is possible to consist between the brightness and the high contrast ratio of the display unit.

According to the present invention, there can be provided a liquid crystal display element which can reduce the liquid crystal drive voltage, and a display unit using this liquid crystal display element.

It should be further understood by those skilled in the art that the foregoing description has been made on embodiments of the invention and that various changes and modifications may be made in the invention without departing from the spirit of the invention and the scope of the appended claims.

What is claimed is:

1. A liquid crystal display element in a projection type liquid crystal display unit, comprising two substrates of a reflection substrate and a transparent substrate, and a liquid crystal layer formed of liquid crystal molecules interposed between said two substrates, wherein a plurality of pixels and active elements for driving the liquid crystal molecules at the plurality of pixels, are incorporated in at least one of the two substrates, and wherein a projection light beam is incident upon and emergent from the liquid crystal layer through the transparent substrate, and the projection light beam is modulated by the liquid crystal molecules in the liquid crystal layer so that the projection light beam is led and reflected within the liquid crystal layer in directions which lie in a plane which is substantially perpendicular to a direction of orientation of the liquid crystal molecules at at least one of the two substrates, and the light beam impinges upon the liquid crystal layer in a direction which is inclined by a predetermined angle other than zero degrees to a direction of a normal line of the transparent substrate, and a direction of polarization of the incident light beam upon the liquid crystal layer is substantially perpendicular or parallel to the direction of the orientation of the liquid crystal molecules.

2. A liquid crystal display element as set forth in claim 1, characterized in that the orientation of the liquid crystal molecules in the liquid crystal layer is homogeneous.

3. A liquid crystal display element as set forth in claim 2, characterized in that an angle between an optical axis of the incident light beam in the liquid crystal layer and the direction of the normal line of the transparent substrate is set to be larger than a total reflection angle upon emanation of the light beam from the substrate into the air.

4. A liquid crystal display element as set forth in claim 2, characterized in that an angle between an optical axis of the incident light beam in the liquid crystal layer and the direction of the normal line of the transparent substrate is set to be not less than a Brewster angle between the transparent substrate and the air.

5. A liquid crystal display element as set forth in claim 2, further comprising a hologram element for the pixels, characterized in that the hologram element is configured so that a p-polarized light beam is not substantially diffracted, but an s-polarized light beam which is generated after it is modulated by the liquid crystal molecules in the liquid crystal layer is diffracted to a direction which is substantially perpendicular to the liquid crystal element.

6. A liquid crystal display element as set forth in claim 2, characterized in that diffraction grating is provided for the pixels, an s-polarized light beam which is generated after it is modulated by the liquid crystal molecules in the liquid crystal layer is diffracted to a direction which is substantially perpendicular to the liquid crystal element.

7. A liquid crystal display element as set forth in claim 1, characterized in that the orientation of the liquid crystal molecules in the liquid crystal layer is homeotropic.

8. A liquid crystal display element as set forth in claim 7, characterized in that an angle between an optical axis of the incident light beam in the liquid crystal layer and the direction of the normal line of the transparent substrate is set to be larger than a total reflection angle upon emanation of the light beam from the transparent substrate into the air.

9. A liquid crystal display element as set forth in claim 7, characterized in that an angle between an optical axis of the incident light beam in the liquid crystal layer and the direction of the normal line of the transparent substrate is set to be not less than a Brewster angle between the transparent substrate and the air.

10. A liquid crystal display element as set forth in claim 7, further comprising a hologram element for the pixels, characterized in that the hologram element is configured so that a p-polarized light beam is not substantially diffracted, but an s-polarized light beam which is generated after it is modulated by the liquid crystal molecules in the liquid crystal layer is diffracted to a direction which is substantially perpendicular to the liquid crystal element.

11. A liquid crystal display element as set forth in claim 7, characterized in that diffraction grating is provided for the pixels, an s-polarized light beam which is generated after it is modulated by the liquid crystal molecules in the liquid crystal layer is diffracted to a direction which is substantially perpendicular to the liquid crystal element.

12. A liquid crystal display element as set forth in claim 1, characterized in that the liquid crystal molecules in the liquid crystal layer are driven by an electric field component which is mainly parallel to the transparent substrate;
  switching is made between directions of orientation of the liquid crystal molecules in two states;
  an optical axis of the incident light beam upon the liquid crystal layer is present in a plane which is substantially perpendicular to one of the directions of the orientation of the liquid crystal molecules in the two states; and
  the incident light beam impinges upon the liquid crystal layer in a direction which is inclined by the predetermined angle to the direction of the normal line of the transparent substrate.

13. A liquid display element as set forth in claim 1, characterized in that a ferroelectric liquid crystal material is used as a liquid crystal material from which the liquid crystal layer is formed;
  switching is made between directions of orientation of the liquid crystal molecules in two states;
  an optical axis of the incident light beam onto the liquid crystal layer is present in a plane which is substantially perpendicular to one of the directions of the orientation of the liquid crystal molecules in the two states; and
  the incident light beam impinges upon the liquid crystal layer in a direction which is inclined by the predetermined angle to the direction of the normal line of the transparent substrate.

14. A liquid display element as set forth in claim 1, characterized in that an antiferroelectric liquid crystal material is used as a liquid crystal material from which the liquid crystal layer is formed;
  switching is made between directions of orientation of the liquid crystal molecules in two states;
  an optical axis of the incident light beam onto the liquid crystal layer is present in a plane which is substantially perpendicular to one of the directions of the orientation of the liquid crystal molecules in the two states; and
  the incident light beam impinges upon the liquid crystal layer in a direction which is inclined by the predetermined angle to the direction of the normal line of the transparent substrate.

15. A display unit characterized by a light source, a color separation optical system for monochromatically separating a white light beam from the optical source, and liquid crystal display elements as set forth in claim 1, corresponding respectively to three primary colors, and characterized in that three primary color beams which are monochromatically separated by the color separation optical system have optical axes which are incident upon the respective liquid crystal display elements, in directions oblique to the liquid crystal display elements,
  there are provided a chromatically synthesizing emergent light beams emanating from the liquid crystal display elements, and a projection lens for projecting the light beam which is chromatically synthesized by the chromatically synthesizing optical system.

16. A display unit as set forth in claim 15, characterized in that the optical axis of the light source and the optical axis of the projection lens are laid at different levels, being parallel to each other or being twisted to one another by an angle of about 90 deg., and optical prisms which can change the optical axes are arranged on optical paths of the color separation optical system and the liquid crystal display elements.

17. A liquid crystal display element in a projection type liquid crystal display unit, comprising two transparent substrates and a liquid crystal layer formed of liquid crystal molecules interposed between the two substrates, wherein a plurality of pixels and active elements for driving liquid crystal molecules in the liquid crystal layer at the plurality of pixels, are incorporated to at least one of the two transparent substrates, wherein a projection light beam is incident upon and emergent from the liquid crystal layer through at least one of the two transparent substrates, and the projection light beam is modulated by the liquid crystal molecules in the liquid crystal layer so as to be led within the liquid crystal layer in directions which lie in a plane which is substantially perpendicular to a direction of orientation of the liquid crystal molecules at at least one of the two transparent substrates, and the light beam impinges upon the liquid crystal layer in a direction which is inclined by a predetermined angle other than zero degrees to a direction of a normal line to at least one of the two transparent substrates, and a direction of polarization of the incident light beam upon the liquid crystal layer is substantially perpendicular or parallel to the direction of the orientation of the liquid crystal molecules.

18. A liquid crystal display element as set forth in claim 17, characterized in that the orientation of the liquid crystal molecules in the liquid crystal layer is homogeneous.

19. A liquid crystal display element as set forth in claim 18, characterized in that an angle between an optical axis of the incident light beam in the liquid crystal layer and the direction of the normal line of the at least one of the two transparent substrates is set to be larger than a total reflection angle upon emanation of the light beam from the transparent substrate into the air.

20. A liquid crystal display element as set forth in claim 18, characterized in that an angle between an optical axis of the incident light beam in the liquid crystal layer and the direction of the normal line of the at least one of the two transparent substrates is set to be not less than a Brewster angle between the transparent substrate and the air.

21. A liquid crystal display element as set forth in claim 18, further comprising a hologram element for the pixels, characterized in that the hologram element is configured so that a p-polarized light beam is not substantially diffracted, but an s-polarized light beam which is generated after it is modulated by the liquid crystal molecules in the liquid crystal layer is diffracted to a direction which is substantially perpendicular to the liquid crystal element.

22. A liquid crystal display element as set forth in claim 18, characterized in that diffraction grating is provided for the pixels, an s-polarized light beam which is generated after it is modulated by the liquid crystal molecules in the liquid crystal layer is diffracted to a direction which is substantially perpendicular to the liquid crystal element.

23. A liquid crystal display element as set forth in claim 18, further comprising hologram elements before and after the liquid crystal layer;
the incident side hologram element diffracts the incident light beam which impinges upon the at least one of the two transparent substrates in a direction which is substantially perpendicular to the transparent substrate so as to allow the incident light beam to impinge upon the liquid crystal layer;
meanwhile the emergent side hologram element diffracts an emergent light beam from the liquid crystal layer into a direction which is substantially perpendicular to the at least one of the two transparent substrates;
the incident side hologram element diffracts the polarized incident light; and
the emergent side hologram element diffracts the emergent light beam having a polarization which is orthogonal to the polarization of the incident light beam.

24. A liquid crystal display element as set forth in claim 18, characterized in that the liquid crystal molecules in the liquid crystal layer are driven by an electric field component which is mainly parallel to the at least one of the two transparent substrates;
switching is made between directions of orientation of the liquid crystal molecules in two states;
the optical axis of the incident light beam onto the liquid crystal layer is present in a plane which is substantially perpendicular to one of the directions of the orientation of the liquid crystal molecules in the two states; and
the incident light beam impinges upon the liquid crystal layer in a direction which is inclined by an predetermined angle to the direction of the normal line of the at least one of the two transparent substrates.

25. A liquid crystal display element as set forth in claim 17, characterized in that the orientation of the liquid crystal molecules in the liquid crystal layer is homeotropic.

26. A liquid crystal display element as set forth in claim 25, characterized in that an angle between an optical axis of the incident light beam in the liquid crystal layer and the direction of the normal line of the at least one of the two transparent substrates is set to be larger than a total reflection angle upon emanation of the light beam from the transparent substrate into the air.

27. A liquid crystal display element as set forth in claim 25, characterized in that an angle between an optical axis of the incident light beam in the liquid crystal layer and the direction of the normal line of the at least one of the two transparent substrates is set to be not less than a Brewster angle between the transparent substrate and the air.

28. A liquid crystal display element as set forth in claim 25, further comprising a hologram element for the pixels, characterized in that the hologram element is configured so that a p-polarized light beam is not substantially diffracted, but an s-polarized light beam which is generated after it is modulated by the liquid crystal molecules in the liquid crystal layer is diffracted to a direction which is substantially perpendicular to the liquid crystal element.

29. A liquid crystal display element as set forth in claim 25, characterized in that diffraction grating is provided for the pixels, an s-polarized light beam which is generated after it is modulated by the liquid crystal molecules in the liquid crystal layer is diffracted to a direction which is substantially perpendicular to the liquid crystal element.

30. A liquid crystal display element as set forth in claim 25, further comprising hologram elements before and after the liquid crystal layer;
the incident side hologram element diffracts the incident light beam which impinges upon the at least one of the two transparent substrates in a direction which is substantially perpendicular to the transparent substrate so as to allow the incident light beam to impinge upon the liquid crystal layer;
meanwhile the emergent side hologram element diffracts the emergent light beam from the liquid crystal layer into a direction which is substantially perpendicular to the at least one of the two transparent substrates;
the incident side hologram element diffracts the polarized incident light beam; and
the emergent side hologram diffracts the emergent light beam having a polarization which is orthogonal to the polarization of the incident light beam.

31. A liquid crystal display element as set forth in claim 25, characterized in that the liquid crystal molecules in the liquid crystal layer are driven by an electric field component which is mainly parallel to the at least one of the two transparent substrates;
switching is made between directions of orientation of the liquid crystal molecules in two states;
the optical axis of the incident light beam upon the liquid crystal layer is present in a plane which is substantially perpendicular to one of the directions of the orientation of the liquid crystal molecules in the two states; and
the incident light beam impinges upon the liquid crystal layer in a direction which is inclined by an predetermined angle to the direction of the normal line of the at least one of the two transparent substrates.

32. A liquid display element as set forth in claim 17, characterized in that a ferroelectric liquid crystal material is used as a liquid crystal material from which the liquid crystal layer is formed;
switching is made between directions of orientation of the liquid crystal molecules in two states;
the optical axis of the incident light beam onto the liquid crystal layer is present in a plane which is substantially perpendicular to one of the directions of the orientation of the liquid crystal molecules in the two states; and
the incident light beam impinges upon the liquid crystal layer in a direction which is inclined by an predetermined angle to the direction of the normal line of the at least one of the two transparent substrates.

33. A liquid display element as set forth in claim 17, characterized in that an antiferroelectric liquid crystal material is used as a liquid crystal material from which the liquid crystal layer is formed;
   switching is made between directions of orientation of the liquid crystal molecules in two states;
   the optical axis of the incident light beam onto the liquid crystal layer is present in a plane which is substantially perpendicular to one of the directions of the orientation of the liquid crystal molecules in the two states; and
   the incident light beam impinges upon the liquid crystal layer in a direction which is inclined by an predetermined angle to the direction of the normal line of the at least one of the two transparent substrates.

34. A display unit as set forth in claim 33, characterized in that the optical axis of the light source and the optical axis of the projection lens are laid at different levels, being parallel to each other or being twisted to one another by an angle of about 90 deg., and optical prisms which can change the optical axes are arranged on optical paths of the color separation optical system and the liquid crystal display elements.

35. A display unit characterized by a light source, a color separation optical system for monochromatically separating a white light beam from the optical source, and liquid crystal display elements as set forth in claim 17, corresponding respectively to three primary colors, and characterized in that three primary color beams which are monochromatically separated by the color separation optical system have optical axes which are incident upon the respective liquid crystal display elements, in directions oblique to the liquid crystal display elements,
   there are provided a chromatically synthesizing emergent light beams emanating from the liquid crystal display elements, and a projection lens for projecting the light beam which is chromatically synthesized by the chromatically synthesizing optical system.

36. A liquid crystal display element as set forth in claim 17, wherein the light beam which is incident upon the liquid crystal layer passes through one of the two transparent substrates before being incident upon the liquid crystal layer, and the light beam which is emergent from the liquid crystal layer passes through the one of the two transparent substrates after being modulated by the liquid crystal molecules.

* * * * *